United States Patent
Ikeda et al.

(10) Patent No.: US 11,449,770 B2
(45) Date of Patent: Sep. 20, 2022

(54) ACTION SELECTION LEARNING DEVICE, ACTION SELECTION LEARNING METHOD, AND STORAGE MEDIUM

(71) Applicant: FUJITSU LIMITED, Kawasaki (JP)

(72) Inventors: Takuro Ikeda, Yokohama (JP); Taizo Anan, Kawasaki (JP); Eiji Kitagawa, Akashi (JP); Vishal Sharma, Singapore (SG)

(73) Assignee: FUJITSU LIMITED, Kawasaki (JP)

( * ) Notice: Subject to any disclaimer, the term of this patent is extended or adjusted under 35 U.S.C. 154(b) by 579 days.

(21) Appl. No.: 16/575,465

(22) Filed: Sep. 19, 2019

(65) Prior Publication Data
US 2020/0012956 A1    Jan. 9, 2020

Related U.S. Application Data

(63) Continuation of application No. PCT/JP2017/016948, filed on Apr. 28, 2017.

(51) Int. Cl.
G06K 9/00    (2022.01)
G06N 5/04    (2006.01)
G06K 9/62    (2022.01)

(52) U.S. Cl.
CPC .......... *G06N 5/04* (2013.01); *G06K 9/6226* (2013.01); *G06K 9/6231* (2013.01); *G06K 9/6265* (2013.01)

(58) Field of Classification Search
None
See application file for complete search history.

(56) References Cited

U.S. PATENT DOCUMENTS

| | | | | |
|---|---|---|---|---|
| 9,913,120 | B2* | 3/2018 | Johnson | H04W 4/029 |
| 10,274,330 | B2* | 4/2019 | Unger | G01C 21/3423 |
| 10,527,437 | B2* | 1/2020 | Epperlein | G01C 21/3415 |
| 11,293,766 | B2* | 4/2022 | Epperlein | G01C 21/20 |

(Continued)

FOREIGN PATENT DOCUMENTS

| | | |
|---|---|---|
| JP | 2001-337967 A | 12/2001 |
| JP | 2012-248017 A | 12/2012 |

(Continued)

OTHER PUBLICATIONS

International Search Report and Written Opinion of the International Searching Authority (Form PCT/ISA/210, 220, and 237), mailed in connection with PCT/JP2017/016948 and dated Jul. 11, 2017 (10 pages).

*Primary Examiner* — Soo Jin Park
(74) *Attorney, Agent, or Firm* — Fujitsu Patent Center

(57) ABSTRACT

An action selection learning device includes a memory; and a processor coupled to the memory and configured to generate a reference model that is a set of model parameter vectors that indicate an influence level of each factor that influences selection of an action alternative, calculate a selection probability for each action alternative, for each of the model parameter vectors, calculate a model parameter vector for each user using a subset of model parameter vectors extracted from the reference model, based on the selection probability for each action alternative and a selection history of the action alternative by each user, generate the action alternatives based on the model parameter vector for each user, and transmit the generated action alternatives to a terminal device.

14 Claims, 20 Drawing Sheets

(56) References Cited

U.S. PATENT DOCUMENTS

| | | |
|---|---|---|
| 2013/0097107 A1 | 4/2013 | Kobayashi |
| 2014/0365250 A1 | 12/2014 | Ikeda et al. |
| 2016/0117610 A1 | 4/2016 | Ikeda et al. |
| 2018/0274927 A1* | 9/2018 | Epperlein .......... G01C 21/3415 |

FOREIGN PATENT DOCUMENTS

| | | |
|---|---|---|
| JP | 2013-81683 A | 5/2013 |
| JP | 2014-104764 A | 6/2014 |
| JP | 2014-106661 A | 6/2014 |
| JP | 2014-222474 A | 11/2014 |
| JP | 2014-238831 A | 12/2014 |
| JP | 2015-001884 A | 1/2015 |
| JP | 2015-97036 A | 5/2015 |
| JP | 2016-085734 A | 5/2016 |

\* cited by examiner

FIG. 4

| USER ID | $ASC_{RAIL}$ | $ASC_{BUS}$ | $ASC_{TAXI}$ | $\beta_F$ | $\beta_{TT}$ | $\beta_{DT}$ | $\beta_{CG}$ | $\beta_{WT}$ |
|---|---|---|---|---|---|---|---|---|
| 001 | 0 | 0 | 5 | -0.5 | -0.3 | -0.4 | -2 | -0.5 |
| 002 | 0 | 1 | 3 | -0.4 | -0.25 | -0.3 | -1 | -0.3 |
| 003 | 0 | -1 | 4 | -0.3 | -0.2 | -0.3 | -1.5 | -0.4 |
| ... | ... | ... | ... | ... | ... | ... | ... | ... |

USER ID = 001

| DATE AND TIME | ACTION ALTERNATIVE | | | SELECTION RESULT |
|---|---|---|---|---|
| | ALTERNATIVE 1 | ALTERNATIVE 2 | ALTERNATIVE 3 | |
| 2017/2/20 17:30 | BUS TRAVEL TIME OF 10 MINUTES/ EXPECTED TO TAKE SEAT | RAILWAY RUSH/ NO DELAY | TAXI WAIT TIME OF LESS THAN 5 MINUTES | ALTERNATIVE 3 |
| 2017/2/21 10:00 | BUS TRAVEL TIME OF 20 MINUTES/ NOT EXPECTED TO TAKE SEAT | RAILWAY RUSH/ DELAY | TAXI WAIT TIME OF 15 MINUTES OR MORE | ALTERNATIVE 3 |

| USER ID = 001 | | | |
|---|---|---|---|
| DATE | TIME | LATITUDE | LONGITUDE |
| 2017/2/20 | 17:30 | ... | ... |
| 2017/2/20 | 17:31 | ... | ... |
| 2017/2/20 | 17:32 | ... | ... |

FIG. 8

| MODEL ID | $\beta_F$ | $\beta_{TT}$ | $\beta_{DT}$ | $\beta_{CG}$ | $\beta_{WT}$ |
|---|---|---|---|---|---|
| 001 | 0 | 0 | 0 | 0 | 0 |
| 002 | 0.1 | 0 | 0 | 0 | 0 |
| 003 | 0.1 | 0.1 | 0 | 0 | 0 |
| 004 | 0.1 | 0.1 | 0.1 | 0 | 0 |
| ⋮ | ⋮ | ⋮ | ⋮ | ⋮ | ⋮ |

# ACTION SELECTION LEARNING DEVICE, ACTION SELECTION LEARNING METHOD, AND STORAGE MEDIUM

CROSS-REFERENCE TO RELATED APPLICATION

This application is a continuation application of International Application PCT/JP2017/016948 filed on Apr. 28, 2017 and designated the U.S., the entire contents of which are incorporated herein by reference.

FIELD

The present invention relates to an action selection learning device, an action selection learning method, and a storage medium.

BACKGROUND

In recent years, with the development of the Internet and the like, various information providing services are in widespread use, and a scene where users of the information providing services take action by referring to provided information is increasing.

For example, conventionally, a service that provides information indicating transfer guidance, a service operation status, a congestion status, and the like of a public transportation facility is known as an information providing service. In addition, conventionally, there is known a service that provides information indicating a menu, a congestion status, and the like of a restaurant located around a place where a user is staying.

Furthermore, conventionally, there is known a technology for presenting a combination in which the expected value of benefit or the expected value of utility is maximized, based on the expected value of benefit or utility, when a combination of transportation facilities presented to the user is selected.

Patent Document 1: Japanese Laid-open Patent Publication No. 2001-337967
Patent Document 2: Japanese Laid-open Patent Publication No. 2014-104764
Patent Document 3: Japanese Laid-open Patent Publication No. 2016-85734

The conventional services mentioned above provide uniform information to a large number of unspecified users, and do not take into consideration the acceptability or the like of alternatives by individual users.

In addition, in order to take into consideration the acceptability of alternatives for individual users in the case of presenting alternatives based on the expected values of benefit and utility with respect to a factor, it is necessary to model, for each user, the expected value of benefit or the expected value of utility or the like with respect to a factor. However, in order to prepare a model for each user, it is necessary to go through a time-consuming and labor-intensive process of presenting various alternatives of actions for each user to select and adjusting parameters based on the results of selection; the implementation is thus extremely difficult. In view of the above, presenting alternatives of actions easily acceptable by users is desirable.

SUMMARY

According to an aspect of the embodiments, an action selection learning device includes a memory; and a processor coupled to the memory and configured to generate a reference model that is a set of model parameter vectors that indicate an influence level of each factor that influences selection of an action alternative, calculate a selection probability for each action alternative, for each of the model parameter vectors, calculate a model parameter vector for each user using a subset of model parameter vectors extracted from the reference model, based on the selection probability for each action alternative and a selection history of the action alternative by each user, generate the action alternatives based on the model parameter vector for each user, and transmit the generated action alternatives to a terminal device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a user database of the first embodiment;

FIG. 5 is a diagram illustrating an example of a selection history database of the first embodiment;

FIG. 6 is a diagram illustrating an example of a position information database of the first embodiment;

FIG. 8 is a diagram to describe a reference model of the first embodiment;

DESCRIPTION OF EMBODIMENTS

First Embodiment

Figure 1:
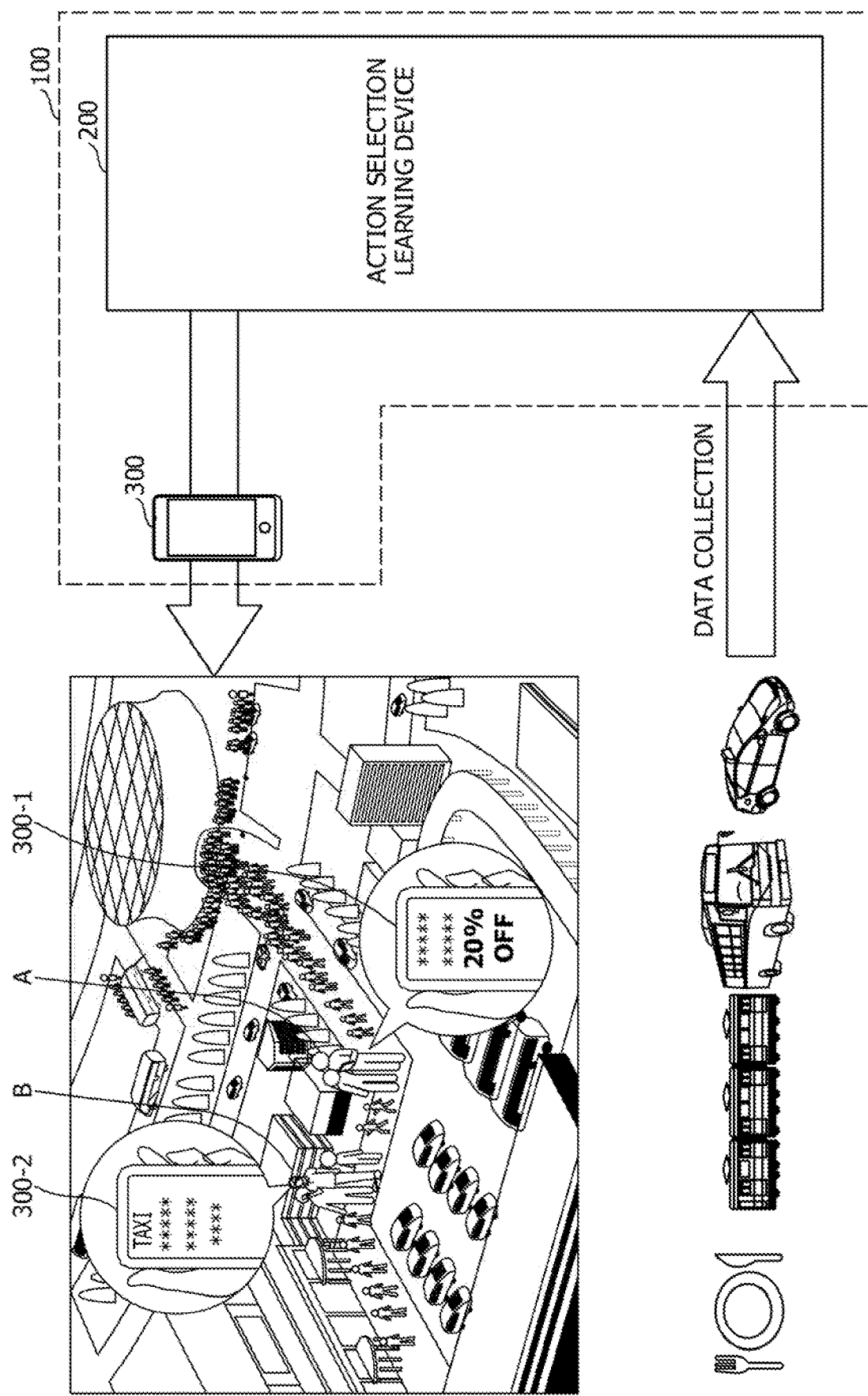
FIG. 1 is a diagram to describe presentation of action alternatives by an action selection learning system of a first embodiment.

A first embodiment will be described below with reference to the drawings. FIG. 1 is a diagram to describe presentation of action alternatives by an action selection learning system of a first embodiment.

The action selection learning system 100 of the present embodiment includes an action selection learning device 200 and a terminal device 300.

When the action selection learning device 200 of the present embodiment accepts a presentation request for an action alternatives from the terminal device 300, the action selection learning device 200 refers to a database in which information around the terminal device 300 is accumulated, and generates a candidate for action alternatives to display the generated candidate on the terminal device 300.

In addition, in the action selection learning device 200 of the present embodiment, using the history of selection of action alternatives on the terminal device 300, a model parameter vector indicating a factor that influences the satisfaction level of a user obtained by the selection of the action, and the influence level of the factor is generated for each user. Then, the action selection learning device 200 of the present embodiment updates the model parameter vector each time the action selection learning device 200 accepts the selection of an action alternative on the terminal device 300.

More specifically, in the present embodiment, a large number of reference models including various parameters indicating the factor that influences the satisfaction level obtained by the selection of the action and the influence level of the factor are generated and, each time the user selects an action alternative, the reference models are clustered (divided) based on the selected action alternative.

Then, in the present embodiment, when a change is no longer produced in the parameter group after clustering, a model parameter vector of this particular user indicating the factor that influences the satisfaction level obtained by the selection of the action, and the influence level of the factor is calculated based on the above-mentioned parameter group after clustering.

Therefore, according to the present embodiment, a complicated procedure such as presenting various alternatives of actions for the user to select becomes unnecessary, and it is possible to generate a model parameter vector for each user by a simple procedure.

Furthermore, when the action selection learning device 200 of the present embodiment accepts a presentation request for action alternatives, the action selection learning device 200 generates action alternatives based on the model parameter vector of the user who has made the presentation request, such that action alternatives easily acceptable by the user of the terminal device 300 can be presented.

In the example in FIG. 1, a user of the terminal device 300-1 stays at a point A, and a user of the terminal device 300-2 stays at a point B. In this case, the action selection learning device 200 acquires information regarding commercial facilities and public transportation facilities around the terminal devices 300-1 and 300-2 in accordance with position information indicating the current location of the terminal device 300-1.

In addition, when the user of the terminal device 300-1 makes a presentation request for action alternatives, the action selection learning device 200 generates action alternatives in accordance with a model parameter vector corresponding to the user of the terminal device 300-1 and information around the terminal device 300-1, and displays the generated action alternatives on the terminal device 300-1. In the example in FIG. 1, a coupon of the limited-time offer on a shopping center is presented on the terminal device 300-1 as one of the action alternatives.

This is because the model parameter vector of the user of the terminal device 300-1 indicates that this user will have a higher satisfaction level by shopping using a coupon ticket than the satisfaction level by returning home quickly.

Accordingly, these action alternatives can be said to be an easily acceptable action alternatives for the user of the terminal device 300-1. In other words, the action alternatives presented on the terminal device 300-1 can be said to be action alternatives with a higher possibility of being selected by the user of the terminal device 300-1.

In addition, in the action selection learning device 200 of the present embodiment, when the action alternative of "going to the limited-time offer on the shopping center" is selected on the terminal device 300-1, the model parameter vector of the user of the terminal device 300-1 is updated using this selection result.

Meanwhile, when the user of the terminal device 300-2 makes a presentation request for action alternatives, the action selection learning device 200 extracts action alternatives in accordance with the model parameter vector of the user of the terminal device 300-2 and information around the terminal device 300-2, and displays the extracted action alternatives on the terminal device 300-2. In FIG. 1, taking a taxi having a wait time of less than five minutes to travel is presented on the terminal device 300-2 as one of the action alternatives.

This is because the model parameter vector of the user of the terminal device 300-2 indicates that, for example, this user will have a higher satisfaction level by having a less wait time and traveling promptly than the satisfaction level by using a transportation means whose transportation cost is cheap.

Accordingly, these action alternative can be said to be an easily acceptable action alternatives with a higher possibility of being selected by the user of the terminal device 300-2.

In the action selection learning device 200 of the present embodiment, when the action alternative of "taking a taxi having a wait time of less than five minutes to travel" is selected on the terminal device 300-2, the model parameter vector of the user of the terminal device 300-2 is updated using this selection result.

As described above, in the present embodiment, since the action alternatives are presented to the user based on the model parameter vector updated each time the user selects the action alternative, it is possible to raise the possibility that one of the presented action alternatives is selected by the user, each time the user selects the action alternative.

In the present embodiment, such a model parameter vector is generated for each user and action alternatives are presented to the user using the model parameter vector for each user, such that the probability of changing the action of the user can be raised. For this reason, according to the present embodiment, even when congestion occurs in a particular area, for example, immediately after the end of an event, it is possible to raise the probability of changing the action of the user and to help to mitigate the congestion.

Figure 2:
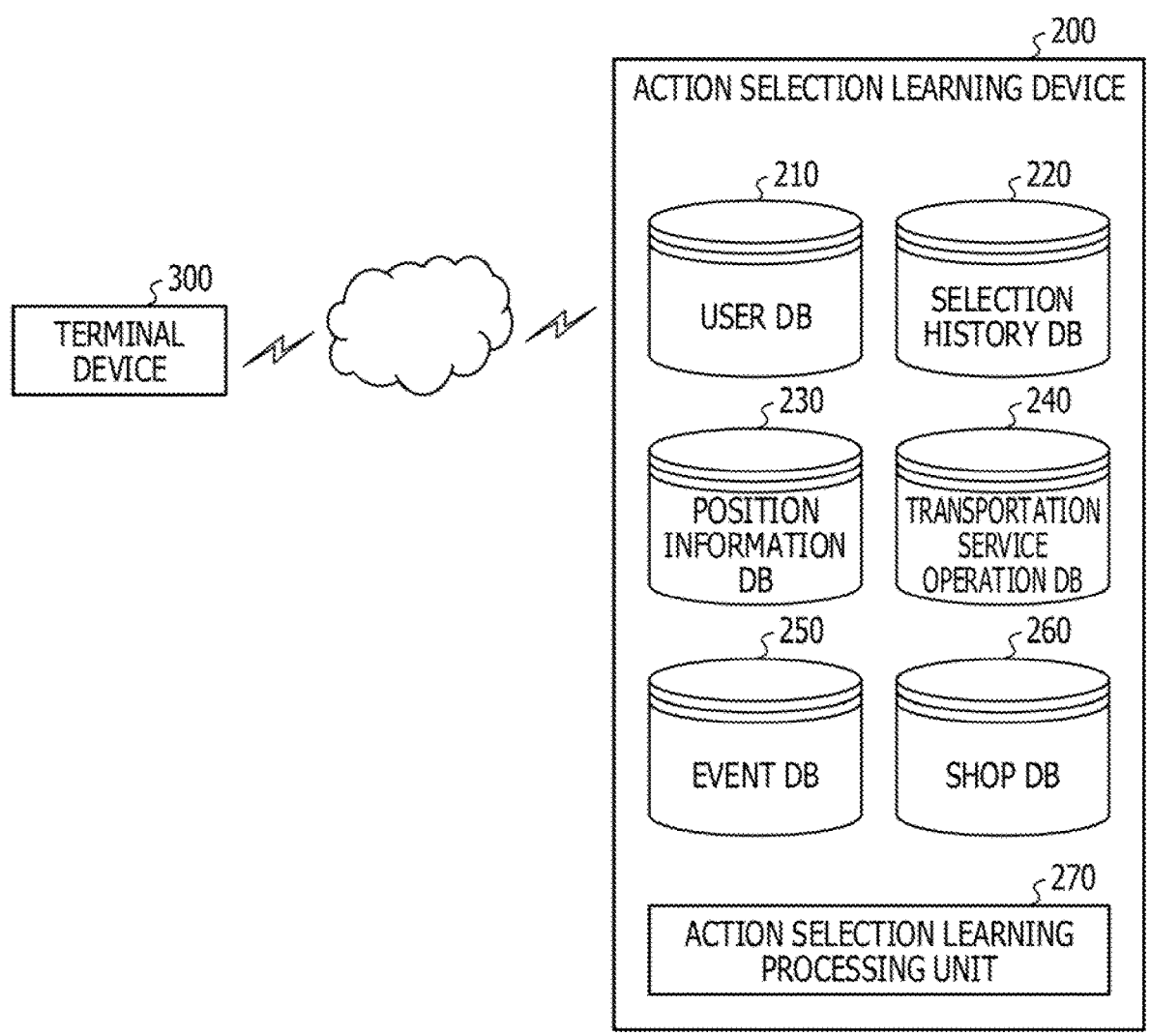
FIG. 2 is a diagram illustrating an exemplary system configuration of the action selection learning system of the first embodiment.

Below, the action selection learning system 100 of the present embodiment will be described. FIG. 2 is a diagram illustrating an exemplary system configuration of the action selection learning system of the first embodiment.

The action selection learning system 100 of the present embodiment includes the action selection learning device 200 and the terminal device 300. In the action selection learning system 100, the action selection learning device 200 and the terminal device 300 are connected via a network.

The action selection learning device 200 according to the present embodiment includes a user database 210, a selection history database 220, a position information database 230, a transportation service operation database 240, an event database 250, a shop database 260, and an action selection learning processing unit 270.

The user database 210 of the present embodiment stores parameters for each user used when calculating the utility of each action alternative by user. In the present embodiment, the utility of the action alternative for each user is calculated using the parameters stored in the user database 210 by the processing of the action selection learning processing unit 270 described later.

The utility of the action alternative is a concept used in the field of microeconomics, and represents a measure of the satisfaction level that the user can obtain by selecting an action alternative. Details of the user database 210 and the calculation of the utility will be described later.

In the selection history database 220 of the present embodiment, action alternatives displayed on the terminal device 300 by the action selection learning processing unit 270 in response to the presentation request for action alternatives from the terminal device 300 is stored in association with an action alternative as the selection result of the selection on the terminal device 300. The selection history database 220 of the present embodiment is referred to when the reference model is clustered by the action selection learning processing unit 270. Details of the selection history database 220 will be described later.

In the position information database 230 of the present embodiment, position information indicating the position of the terminal device 300 is stored in association with the date and time when the position information was acquired. Details of the position information database 230 will be described later.

The transportation service operation database 240 of the present embodiment stores information regarding the service operation of each transportation means. The information regarding the service operation of each transportation means includes, for example, the position of the boarding point such as a station or a bus stop, information on a line connecting boarding points, and information regarding transfer between lines. The information regarding the service operation of each transportation means also includes information regarding fares such as transportation cost, timetable information indicating at which time each vehicle departs from and arrives at which boarding point, the capacity of passengers on each vehicle, and the like.

The event database 250 of the present embodiment stores information regarding an event held in each area. The information regarding the event includes, for example, the type of the event, and the date and time and the place fixed for the event. Note that the area is, for example, an area around a position indicated by the position information acquired from the terminal device 300.

The shop database 260 of the present embodiment stores information regarding a shop in each area. The information regarding the shop includes, for example, the type, business hours, and the location of the shop. The type of shop may have, for example, a restaurant, a jewelry shop, a general shop, or a bookshop. The area is, for example, an area around a position indicated by the position information acquired from the terminal device 300.

Note that, although each database is assumed to be provided in the action selection learning device 200 in the example in FIG. 2, the configuration is not limited to this example. In particular, the transportation service operation database 240, the event database 250, the shop database 260, and the like of the present embodiment may be provided in a storage device external to the action selection learning device 200.

The action selection learning processing unit 270 of the present embodiment generates, for each user of the terminal device 300, a model parameter vector indicating the factor that influences the satisfaction level obtained by the selection of the action and the influence level of the factor. In addition, when the action selection learning processing unit 270 of the present embodiment acknowledges a presentation request for action alternatives from the terminal device 300, the action selection learning processing unit 270 generates action alternatives to be displayed on the terminal device 300, based on the model parameter vector corresponding to the user of the terminal device 300. Details of the action selection learning processing unit 270 will be described later.

Figure 3:
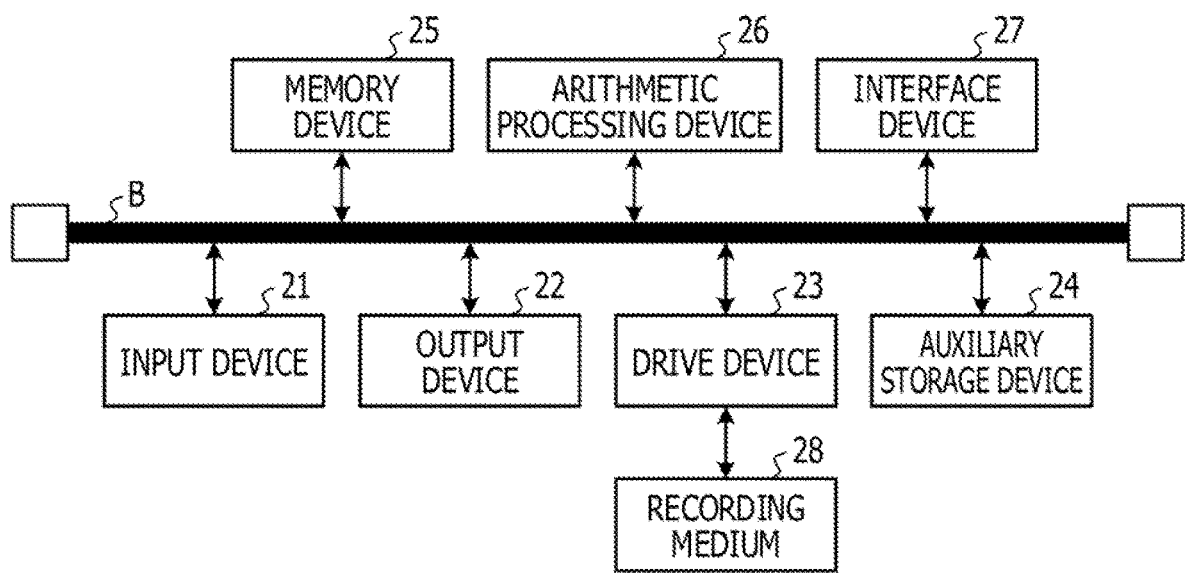
FIG. 3 is a diagram illustrating an exemplary hardware configuration of the first embodiment.

Next, the hardware configuration of the action selection learning device 200 of the present embodiment will be described with reference to FIG. 3. FIG. 3 is a diagram illustrating an exemplary hardware configuration of the first embodiment.

The action selection learning device 200 of the present embodiment includes an input device 21, an output device 22, a drive device 23, an auxiliary storage device 24, a memory device 25, an arithmetic processing device 26, and an interface device 27, all of which are mutually connected by a bus B.

The input device 21 is a device used to input various kinds of signals and display various kinds of information and is, for example, a mouse or a keyboard. The output device 22 is a device used to output various kinds of information and is, for example, a display.

The interface device 27 includes a modem, a local area network (LAN) card, and the like, and is used for connection to a network.

An action selection learning program is at least a part of various kinds of programs controlling the action selection learning device 200. The action selection learning program is provided by, for example, distributing a recording medium 28, being downloaded from the network, and the like. As the recording medium 28 recording the action selection learning program, it is possible to use various types of recording media such as: recording media that optically, electrically, or magnetically records information, like a compact disk read only memory (CD-ROM), a flexible disk, or a magneto-optical disc; a semiconductor memory that electrically records information, like a read only memory (ROM) or a flash memory; and the like.

Additionally, the action selection learning program is installed in the auxiliary storage device 24 from the recording medium 28 via the drive device 23 when the recording medium 28 recording the action selection learning program is set in the drive device 23. The action selection learning program downloaded from the network is installed in the auxiliary storage device 24 via the interface device 27.

The auxiliary storage device 24 stores the installed action selection learning program and also stores necessary files, data, and the like. The memory device 25 reads out and stores the action selection learning program from the auxiliary storage device 24 at the time of starting the computer. Additionally, the arithmetic processing device 26 implements various kinds of processing as described later in accordance with the action selection learning program stored in the memory device 25.

Note that the terminal device 300 of the present embodiment is a general tablet computer, a smartphone, or the like, and the hardware configuration thereof is similar to the hardware configuration of a congestion management device except that the terminal device 300 has a display operation device instead of the input device and the output device; accordingly, the description will be omitted. In addition, the terminal device 300 may be a terminal device other than a tablet computer or a smartphone. Specifically, the terminal device 300 may be, for example, a notebook computer or a general desktop computer.

Next, each database included in the action selection learning device 200 of the present embodiment will be described.

FIG. 4 is a diagram illustrating an example of the user database of the first embodiment. The user database 210 of the present embodiment has, as items of information, user ID, $ASC_{RAIL}$, $ASC_{BUS}$, $ASC_{TAXI}$, $\beta_F$, $\beta_{TT}$, $\beta_{DT}$, $\beta_{CG}$, and $\beta_{WT}$.

In the user database 210 of the present embodiment, the item "user ID" is associated with the values of the other items, and information including the item "user ID" and the values of the other items is called user information. In addition, in the present embodiment, respective parameters associated with the user ID in the user information are called a model parameter vector.

Note that, in the user database 210 in FIG. 4, the item "user ID" is assumed to be associated with each parameter; however, the user database 210 is not limited to this example. In the user database 210, the user ID may be associated with the user's name, age, gender, and the like in addition to each parameter.

The value of the item "user ID" is identification information that specifies a user. Note that, as for the value of the item "user ID" in the present embodiment, for example, identification information for specifying the terminal device 300 may be utilized as the user ID when the terminal device 300 is used only by a particular user.

The value of the item "$ASC_{RAIL}$" indicates a measure of the satisfaction level of the user obtained by selecting a railway R. The value of the item "$ASC_{BUS}$" indicates a measure of the satisfaction level of the user obtained by selecting a bus B. The value of the item "$ASC_{TAXI}$" indicates a measure of the satisfaction level of the user obtained by selecting a taxi T.

The value of each of the items "$ASC_{RAIL}$", "$ASC_{BUS}$", and "$ASC_{TAXI}$" is a specific constant defined for each action alternative.

The value of the item "$\beta_F$" indicates a weight on the fare produced by selecting the action alternative. In other words, the value of the item "$\beta_F$" indicates the extent to which the fare contributes to the satisfaction level when the user selects the action alternative.

The value of the item "$\beta_{TT}$" Indicates a weight on the travel time. In other words, the value of the item "$\beta_{TT}$" indicates the extent to which the travel time contributes to the satisfaction level when the user selects the action alternative.

The value of the item "$\beta_{DT}$" indicates a weight on the dwell time. The dwell time is the time from the scheduled departure time to the time when traveling is actually started. In other words, the value of the item "$\beta_{DT}$" indicates the extent to which the extension time in which the actual departure is extended from the scheduled departure time contributes to the satisfaction level when the user selects the action alternative.

The value of the item "$\beta_{CG}$" indicates a weight on the congestion level concerning an action corresponding to the selected action alternative. The value of the item "$\beta_{CG}$" indicates the extent to which the congestion level contributes to the satisfaction level when the user selects the action alternative. The congestion level indicates, for example, the congestion level of the action alternative when an action corresponding to the selected action alternative is traveling. In addition, the congestion level indicates, for example, the congestion level of a shop where shopping is performed, when an action corresponding to the selected action alternative is shopping. That is, the congestion level in the present embodiment indicates the congestion level encountered when an action corresponding to the action alternative is performed.

The value of the item "$\beta_{WT}$" indicates a weight on the wait time. The wait time means a time period from the time when the action is put into the waiting state up to the time when the action is started. The wait time also means, for example, a time period from joining the waiting queue up to taking a taxi, when the action alternative is traveling by taxi. Alternatively, the wait time means a period from joining the waiting queue up to the time of entering the shop, when the action alternative is a meal at a restaurant.

In other words, the value of the item "$\beta_{WT}$" indicates the extent to which the wait time until the action is performed contributes to the satisfaction level when the user selects the action alternative. Specifically, for example, the value of the item "$\beta_{WT}$" indicates a weight on the wait time until traveling is started, a weight on the wait time until intended shopping begins, and the like.

In FIG. 4, a user with the user ID "001" has a value of the item "$\beta_{CG}$" of "−2", which is the smallest value among the items indicating the weights. From this fact, it can be seen that the user with the user ID "001" is a user who tends to dislike congestion.

Note that, in the example in FIG. 4, the parameters associated with the user ID has been described as parameters related to the transportation facilities; however, the parameters are not limited to this example. In addition, in the present embodiment, for example, an item "ASC" for each type (category) of shop may be included as a specific constant defined for each action alternative. Specifically, in the case of, for example, a restaurant, the value of the item "ASC" may be defined according to the type of food or the like in the shop. Furthermore, for example, the value of the item "ASC" may be defined according to the type of shop (restaurant, home appliance shop, bookshop, and the like).

As described above, in the present embodiment, a matter to be weighted by the model parameter vector is assumed as a factor that influences the satisfaction level obtained by the user's selection of the action. Accordingly, in the present embodiment, a value indicating, for each user, the degree of influence of each factor on the satisfaction level owing to selecting the action alternative means the model parameter vector of the user. That is, in the example in FIG. 4, the factor to be weighted by the model parameter vector included in the user information includes the fare, the travel time, the dwell time, the congestion level, and the wait time produced by selecting the action.

Next, the selection history database 220 of the present embodiment will be described with reference to FIG. 5. FIG. 5 is a diagram illustrating an example of the selection history database of the first embodiment.

In the selection history database 220 of the present embodiment, an action alternative presented on the terminal device 300 is associated with an action alternative selected on the terminal device 300. In addition, the selection history database 220 of the present embodiment may be provided for each user ID.

FIG. 5 illustrates an example in which action alternatives presented on the terminal device 300 of the user with the user ID "001" are associated with an action alternative selected on the terminal device 300 of the user with the user ID "001".

The selection history database 220 of the present embodiment has, as items of information, the date and time, the action alternatives, and the selection result. In the following description, information including the value of each item in the selection history database 220 is called selection history information.

The value of the item "date and time" indicates the date and time when the selection result for the action alternatives is received from the terminal device 300. The item "action alternative" includes a plurality of items "alternative 1" to "alternative 3" indicating a plurality of action alternatives presented on the terminal device 300. The value of the item "selection result" indicates an action alternative selected on the terminal device 300 from among the items "alternative 1" to "alternative 3" included in the item "action alternative".

In the example in FIG. 5, it can be seen that, from among three action alternatives presented on the terminal device 300 at 17:30 on Feb. 20, 2017, namely, "bus/travel time of 10 minutes/expected to take seat", "railway/rush/no delay", and "taxi/wait time of less than 5 minutes", the user with the user ID "001" has selected the third action alternative "taxi/wait time of less than 5 minutes".

Note that, in the example in FIG. 5, the three action alternatives are assumed to be presented to the user with the user ID "001"; however, the action alternatives to be presented are not limited to this example. The number of action alternatives presented to the user can be any number.

Furthermore, in the example in FIG. 5, alternatives relating to transportation facilities are illustrated; however, in the present embodiment, various action alternatives are presented based on the event database 250, the shop database 260, and the like, in addition to the action alternatives relating to transportation facilities.

Next, the position information database 230 will be described with reference to FIG. 6. FIG. 6 is a diagram illustrating an example of the position information database of the first embodiment.

Similarly to the selection history database 220, the position information database 230 of the present embodiment is provided for each user ID. In FIG. 6, the position information database 230 of the user with the user ID "001" is illustrated.

The position information database 230 of the present embodiment includes, as items of information, date, time, latitude, and longitude. The values of the items "date" and "time" indicate the date and time when the position information was acquired. The values of the items "latitude" and "longitude" indicate the latitude and longitude of the terminal device 300. In the following description, information including the values of the items "date", "time", "latitude", and "longitude" is called position information.

Figure 7:
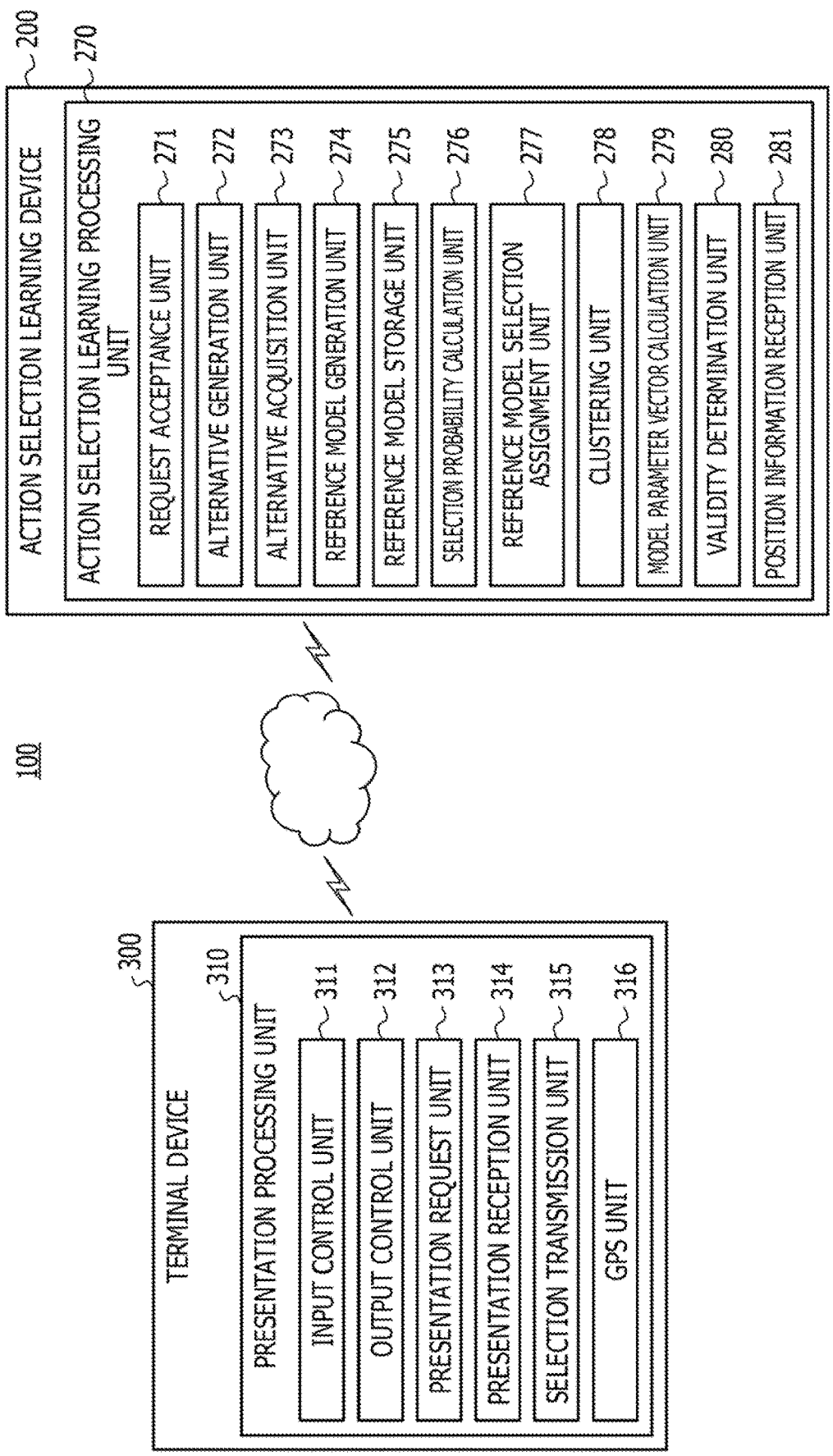
FIG. 7 is a diagram to describe functions of respective devices included in the action selection learning system of the first embodiment.

Next, functions of the respective devices included in the action selection learning system 100 of the present embodiment will be described with reference to FIG. 7. FIG. 7 is a diagram to describe functions of the respective devices included in the action selection learning system of the first embodiment.

First, the function of the action selection learning device 200 will be described. In the action selection learning system 100 of the present embodiment, the action selection learning device 200 includes the action selection learning processing unit 270. The action selection learning processing unit 270 of the present embodiment is implemented by the arithmetic processing device 26 of the action selection learning device 200 executing the action selection learning program installed in the action selection learning device 200.

The action selection learning processing unit 270 of the present embodiment includes a request acceptance unit 271, an alternative generation unit 272, an alternative acquisition unit 273, a reference model generation unit 274, a reference model storage unit 275, a selection probability calculation unit 276, a reference model selection assignment unit 277, a clustering unit 278, a model parameter vector calculation unit 279, a validity determination unit 280, and a position information reception unit 281.

The request acceptance unit 271 of the present embodiment receives a presentation request and the like transmitted from the terminal device 300. The presentation request includes the designation of conditions such as the user ID, the action day, the desired action start time or desired action end time, and the action start place. In addition, in the present embodiment, in a case where the requested action alternatives are, for example, action alternatives indicating how to travel by means of transportation facilities, the presentation request may include the user ID, the use date of transportation facilities, the desired departure time or desired arrival schedule time, the departure point, and the destination point.

The alternative generation unit 272 generates action alternatives using the model parameter vector with the user ID corresponding to the terminal device 300 that has made a presentation request for action alternatives, and transmits the generated action alternatives to the terminal device 300 that has made the presentation request. The action alternatives of the present embodiment includes, for example, an alternative of a traveling action, such as an available transportation means, and an alternative of a purchasing action, such as information on a shop nearby where a stop before returning home is practicable.

The alternative acquisition unit 273 receives and acquires an action alternative selected by the user on the terminal device 300 from among the action alternatives presented on the terminal device 300.

The reference model generation unit 274 generates a reference model which is a set of model parameter vectors. Details of the reference model will be described later. The reference model storage unit 275 stores the reference model generated by the reference model generation unit 274. The reference model storage unit 275 also stores an extraction reference model after clustering by the clustering unit 278.

The selection probability calculation unit 276 calculates the selection probability of each action alternative based on the model parameter vector. More specifically, the selection probability calculation unit 276 calculates the selection probability of each action alternative presented on the terminal device 300 for each model parameter vector included in the reference model. Details of the calculation of the selection probability will be described later.

The reference model selection assignment unit 277 assigns, for each model parameter vector, an action alternative to be selected from among the action alternatives presented on the terminal device 300, based on the calculated selection probability of each action alternative. Specifically, the reference model selection assignment unit 277 assigns an action alternative having the highest calculated selection probability among the action alternatives, as the action alternative to be selected for the model parameter vector.

The clustering unit 278 extracts, from the reference model, a model parameter vector in which the action alternative selected by the reference model selection assignment unit 277 matches with the action alternative selected by the user of the terminal device 300 on the terminal device 300, to generate an extraction reference model. In the present embodiment, the extraction reference model is a part (subset) of the reference model and is a set of model parameter vectors.

The model parameter vector calculation unit 279 calculates a model parameter vector of the user of the terminal device 300 from the extraction reference model, and stores the calculated model parameter vector in the user database 210 as user information. Details of the calculation of the model parameter vector of the present embodiment will be described later.

The validity determination unit 280 determines whether the model parameter vector calculated by the model parameter vector calculation unit 279 is valid. Specifically, the validity determination unit 280 calculates an action alternative having the highest selection probability from the action alternatives presented on the terminal device 300, using the calculated model parameter vectors. Then, when the action alternative having the highest selection probability matches with the action alternative selected by the user on the terminal device 300, the validity determination unit 280 determines that the calculated model parameter vector is valid.

The position information reception unit 281 receives the position information on the terminal device 300 from the terminal device 300, and stores the received position information in the position information database 230 for each terminal device 300.

Next, the function of the terminal device 300 will be described. The terminal device 300 of the present embodiment includes a presentation processing unit 310.

The presentation processing unit 310 of the present embodiment includes an input control unit 311, an output control unit 312, a presentation request unit 313, a presentation reception unit 314, a selection transmission unit 315, and a global positioning system (GPS) unit 316. These respective units are implemented by a program installed in the terminal device 300 being executed by an arithmetic processing device of the terminal device 300.

The input control unit 311 of the present embodiment accepts input of various kinds of information. The output control unit 312 outputs various kinds of information. Specifically, the output control unit 312 displays the action alternatives received by the presentation reception unit 314 on the display operation device or the like.

The presentation request unit 313 makes a presentation request for action alternatives to the action selection learning device 200. The presentation request unit 313 of the present embodiment transmits conditions such as the user ID, the action day, the desired action start time or desired action end time, and the action start place to the action selection learning device 200 together with the presentation request.

The presentation reception unit 314 receives a response to the presentation request transmitted by the presentation request unit 313. Specifically, the presentation reception unit 314 receives information indicating action alternatives transmitted from the action selection learning device 200.

When the action alternatives received by the presentation reception unit 314 are displayed on the display operation device by the output control unit 312 and an action alternative is selected by the user of the terminal device 300, the selection transmission unit 315 transmits the selected action alternative to the action selection learning device 200. Specifically, the selection transmission unit 315 may transmit information that specifies the selected action alternative to the action selection learning device 200, or may transmit information indicating the whole selected action alternative to the action selection learning device 200.

The GPS unit 316 acquires position information indicating the current position of the terminal device 300 based on a GPS signal received by the terminal device 300. In addition, the GPS unit 316 transmits the acquired position information to the action selection learning device 200.

In the terminal device 300 of the present embodiment, a request transmission unit 320 may transmit the position information acquired by the GPS unit 316, instead of the departure point, to the action selection learning device 200 together with the presentation request.

Next, how the selection probability calculation unit 276 of the present embodiment calculates the selection probability will be described.

In the embodiment, the selection of the action alternative by the user can be computed using a multinomial logit model (MNL) as illustrated in following expression (1).

[Expression 1]

$$Prob_i = \frac{\exp(V_i)}{\sum_{j \in A} \exp(V_j)} \qquad \text{Expression (1)}$$

A: Alternative Set

In the above expression, $Prob_i$ denotes the selection probability of an action alternative i when a set A of certain action alternatives is presented. Here, Vi denotes the utility of the action alternative i. The utility Vi represents a measure of the satisfaction level obtained by selecting an action alternative.

The utility Vi can be calculated, for example, by following expression (2). Each variable $x_k$ in the expression denotes a factor that influences the utility, and $\beta_k$ denotes a model parameter that represents the degree of influence of the factor on the utility. In the present embodiment, a vector β including a plurality of model parameters is called a model parameter vector.

[Expression 2]

$$V_i = \Sigma \beta_k x_k \qquad \text{Expression (2)}$$

$x_k$: Factor $\beta = (\beta_1, \beta_2, \ldots, \beta_k)$: Model Parameter Vector For example, the utility Vi relating to the action of traveling among the action alternatives can be calculated by following expression (3).

[Expression 3]

$$V_i = ASC_m + \beta_F \times F_i + \beta_{TT} \times TT_i + \beta_{DT} \times DT_i + \beta_{WT} \times WT_i + \beta_{CG} \times CG_i \qquad \text{Expression (3)}$$

ASC: Alternative Specific Constant
F: Fare
TT: Travel Time
DT: Dwell Time
WT: Wait Time
CG: Congestion Level
$\beta_i$: Parameter for each variable In expression (3), as factors that influence the utility Vi, the fare, the trip time, the dwell time, the wait time, and the congestion level of transportation means are included as variables. In addition, the utility Vi illustrated in expression (3) includes an alternative specific constant relating to transportation means.

That is, in the present embodiment, a model parameter vector β is obtained by indicating the degree of influence on the satisfaction level obtained by selecting an action alternative, for each factor.

Respective parameters associated with the user ID in the user information for each user stored in the user database 210 of the present embodiment indicate the model parameter vector β for each user (see FIG. 4).

Next, the reference model of the present embodiment will be described with reference to FIG. 8. FIG. 8 is a diagram to describe the reference model of the first embodiment.

The reference model 80 of the present embodiment is a set of model parameter vectors β, in which the values of the respective parameters included in the model parameter vectors β are set to discrete values and all possible combinations are worked out.

The reference model 80 illustrated in FIG. 8 is an example generated by changing the values of the respective parameters, assuming $\beta_1, \beta_2, \ldots,$ and $B_k$ illustrated in expression (2) as $\beta_F, \beta_{TT}, \beta_{DT}, \beta_{CG},$ and $\beta_{WT}$.

In the reference model 80 illustrated in FIG. 8, for example, a model ID may be associated with the model parameter vector β, and one record corresponding to the model ID represents one model parameter vector β. Note that, although not illustrated in FIG. 8, an alternative specific constant ASC may also be included in the model parameter vector.

Next, prior to the description of the processing of the action selection learning device 200 and the terminal device 300 of the present embodiment, an outline of the processing by the action selection learning processing unit 270 of the present embodiment will be described.

Figure 9:
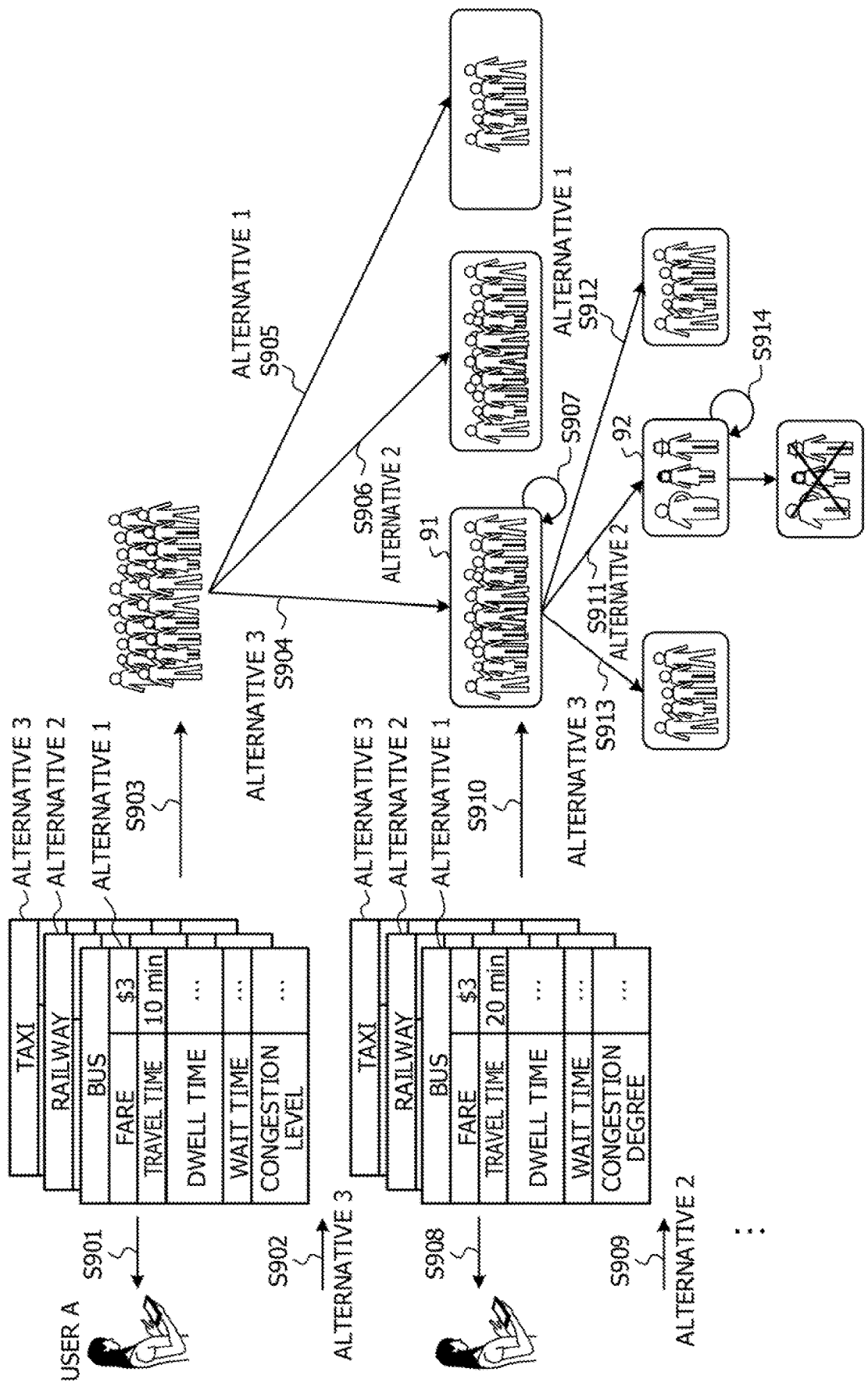
FIG. 9 is a diagram to describe an outline of processing by an action selection learning processing unit of the first embodiment.

FIG. 9 is a diagram to describe an outline of the processing by the action selection learning processing unit of the first embodiment. Note that, in FIG. 9, the reference model 80 is assumed to be already generated. In addition, the human figures illustrated in FIG. 9 indicate model parameter vectors different from each other.

In FIG. 9, when the action selection learning processing unit 270 acknowledges a presentation request from the terminal device 300, the action selection learning processing unit 270 generates action alternatives based on the acknowledged presentation request, and transmits the generated action alternatives to the terminal device 300 (step S901). The action alternatives transmitted here are assumed as action alternatives of alternatives 1 to 3.

Alternatives 1 to 3 are displayed on the terminal device 300. In FIG. 9, it is assumed that alternative 3 is selected by a user A of the terminal device 300. In this case, the terminal device 300 notifies the action selection learning processing unit 270 that alternative 3 has been selected (step S902).

Then, the action selection learning processing unit 270 supplies selection history information including alternatives 1 to 3 and the selection result to the reference model 80, and calculates the selection probability of alternatives 1 to 3 for each model parameter vector β included in the reference model 80 (step S903).

Thereafter, the action selection learning processing unit 270 extracts a cluster (set) 91 of model parameter vectors β having the highest selection probability for alternative 3, which is the selection result included in the selection history information (step S904). That is, the cluster 91 is a set of model parameter vectors β having the highest probability for selecting the same alternative as the user A in the reference model 80.

In addition, the action selection learning processing unit 270 classifies a set of model parameter vectors β having the highest selection probability for alternative 1, and a set of model parameter vectors β having the highest selection probability for alternative 2, as models that make different selections from the user A (steps S905 and 906).

Next, the action selection learning processing unit 270 calculates a model parameter vector of the user A of the terminal device 300 from the model parameter vectors β included in the cluster 91, and updates user information corresponding to the user A in the user database 210 (step S907).

Next, when the action selection learning processing unit 270 acknowledges a presentation request for an alternative option from the terminal device 300 next, the action selection learning processing unit 270 generates action alternatives (alternatives 1 to 3) based on the user information (model parameter vector) updated in step S907, and transmits the generated action alternatives to the terminal device 300 (step S908).

Here, it is assumed that alternative 2 is selected by the user A on the terminal device 300. Therefore, the terminal device 300 notifies the action selection learning processing unit 270 that alternative 2 has been selected (step S909).

The action selection learning processing unit 270 supplies selection history information including alternatives 1 to 3 and the selection result to the cluster 91 clustered in the previous selection, and calculates the selection probabilities of alternatives 1 to 3 for each model parameter vector β included in the cluster 91 (step S910).

Then, the action selection learning processing unit 270 extracts, from the cluster 91, a cluster 92 of model parameter vectors β having the highest selection probability for alternative 2, which is the selection result (step S911). The cluster 92 is a set of model parameter vectors β having the highest probability for selecting the same alternative as the user A in the cluster 91.

In addition, the action selection learning processing unit 270 classifies a set of model parameter vectors β having the highest selection probability for alternative 1, and a set of model parameter vectors β having the highest selection probability for alternative 3, as models that make different selections from the user A (steps S912 and 913).

Next, the action selection learning processing unit 270 calculates a model parameter vector of the user A of the terminal device 300 from the model parameter vectors β included in the cluster 92, and updates user information corresponding to the user A in the user database 210 (step S914).

In the present embodiment, the processing of extracting, from the reference model 80, a set of model parameter vectors β in which the selection probability matches with the selection result by the user A is repeated in this manner. Then, in the present embodiment, when the cluster before supplying the selection history information matches with the cluster after supplying the selection history information, the model parameter vector β of the user A calculated according to the matching cluster is fixed. That is, the modeling of the expected value of benefit or the expected value of utility with respect to the factor is completed for the user A.

Hereinafter, processing of each device of the action selection learning system 100 of the present embodiment will be described with reference to FIGS. 10 to 12. First, processing of the terminal device 300 will be described with reference to FIG. 10.

Figure 10:
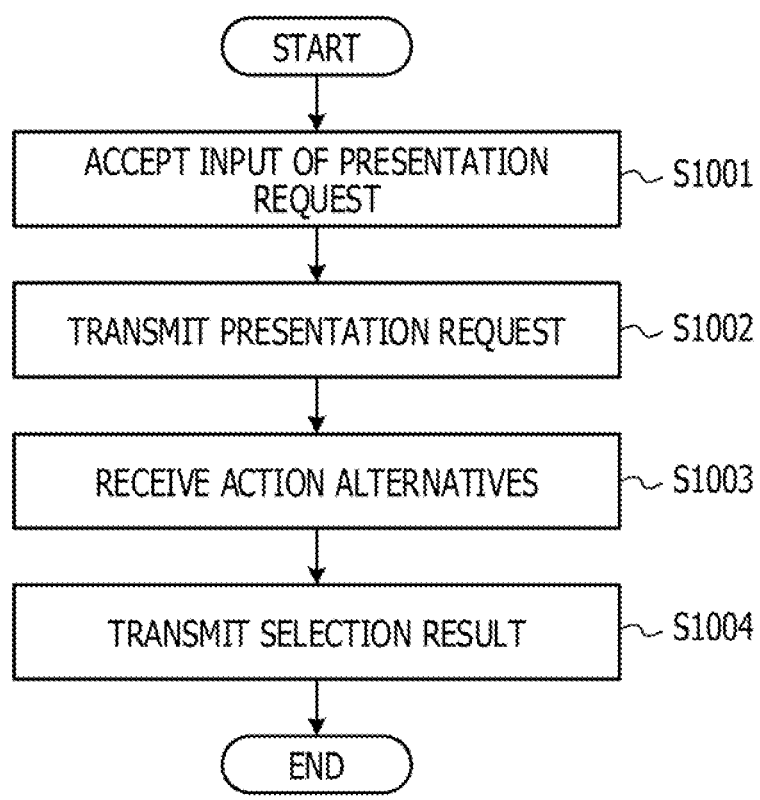
FIG. 10 is a flowchart to describe processing of a terminal device of the first embodiment.

FIG. 10 is a flowchart to describe processing of the terminal device of the first embodiment. The terminal device 300 of the present embodiment causes the input control unit 311 to accept input of the presentation request for action alternatives from the user of the terminal device 300 (step S1001). Note that, at this time, the input control unit 311 may accept input of the user ID, the use date of transportation facilities, the desired departure time or desired arrival schedule time, the departure point, the destination point, and the like, together with the presentation request.

Subsequently, the terminal device 300 causes the presentation request unit 313 to transmit the input presentation request to the action selection learning device 200 (step S1002).

Next, the terminal device 300 causes the presentation reception unit 314 to receive the action alternatives from the action selection learning device 200, and causes the output control unit 312 to display the action alternatives on the display operation device of the terminal device 300 (step S1003).

Subsequently, when the selection of an action alternative is accepted by the input control unit 311, the terminal device 300 causes the selection transmission unit 315 to transmit the selected action alternative to the action selection learning device 200 (step S1004), and ends the processing. Note that the selection transmission unit 315 may transmit information indicating the selected action alternative to the action selection learning device 200, or may transmit information that specifies the selected action alternative, such as an identifier, to the action selection learning device 200.

Next, processing of the action selection learning device 200 of the present embodiment will be described with reference to FIG. 11. FIG. 11 is a first flowchart to describe processing of the action selection learning device of the first embodiment.

The action selection learning processing unit 270 of the action selection learning device 200 of the present embodiment causes the request acceptance unit 271 to accept a presentation request for action alternatives from the terminal device 300 (step S1201).

Subsequently, the action selection learning processing unit 270 causes the alternative generation unit 272 to generate action alternatives (step S1102). Specifically, the alternative generation unit 272 may generate action alternatives with reference to the user information in the user database 210, the transportation service operation database 240, the event database 250, the shop database 260, and the like, based on the use date of transportation facilities, the desired departure time or desired arrival schedule time, the departure point, the destination point, and the like accepted together with the presentation request.

Next, the action selection learning processing unit 270 causes the alternative generation unit 272 to transmit the generated action alternatives to the terminal device 300 (step S1103). Note that the action alternative generated here is stored in the selection history database 220 as selection history information associated with the user ID of the terminal device 300 that has made the presentation request.

Subsequently, the action selection learning processing unit 270 causes the alternative acquisition unit 273 to receive action alternatives selected on the terminal device 300. Then, the alternative acquisition unit 273 stores the received action alternative in the selection history database 220 as a selection result for the action alternatives transmitted in step S1103 in association with the received action alternative (step S1104).

Next, the action selection learning processing unit 270 performs update processing for the model parameter vector of the user (step S1105), and ends the processing.

Next, the update processing for the model parameter vector of the user will be described with reference to FIG. 12. FIG. 12 is a second flowchart to describe processing of the action selection learning device of the first embodiment. FIG. 12 illustrates the details of the update processing for the model parameter vector of the user illustrated in step S1105 of FIG. 11.

The action selection learning processing unit 270 of the present embodiment determines whether the update of the model parameter vector of the user is necessary (step S1201). Specifically, the action selection learning processing unit 270 may determine that the update of the model parameter vector is unnecessary when the model parameter vector of the user was not updated at the previous presentation of action alternatives.

Note that information indicating whether the model parameter vector was updated may be held in, for example, the user database 210 or the selection history database 220.

When it is determined in step S1201 that the update of the model parameter vector is unnecessary, the action selection learning processing unit 270 ends the processing.

When it is determined in step S1201 that the update of the model parameter vector is necessary, the action selection learning processing unit 270 determines whether the reference model is stored in the reference model storage unit 275 (step S1202).

In the present embodiment, a case where the reference model is not stored in the reference model storage unit 275 means the case of i=1, where the number of times the action selection learning device 200 has received the action alternative selected on the terminal device 300 is assumed as i. In other words, a case where the reference model is not stored is when the action selection learning device 200 receives the action alternative selected on the terminal device 300 for the first time from the terminal device 300.

When the reference model is not stored in step S1202, the reference model generation unit 274 generates a cluster $C_0$ (reference model) and stores the generated cluster $C_0$ in the reference model storage unit 275 (step S1203).

When the reference model is stored in step S1202, the action selection learning processing unit 270 causes the selection probability calculation unit 276 to calculate the selection probability of each action alternative, for each model parameter vector β included in the reference model (cluster $C_{i-1}$) generated previously (step S1204).

Here, the action alternative whose selection probability is to be calculated is the action alternative stored in the selection history database 220 in step S1103. In other words, all the action alternatives presented on the terminal device 300 are the action alternatives whose selection probabilities are to be calculated. In addition, at this time, the reference model stored in the reference model storage unit 275 is an extraction reference model clustered by the clustering unit 278 at the time of the previous presentation of action alternatives.

Subsequently, the action selection learning processing unit 270 causes the reference model selection assignment unit 277 to assign, for each model parameter vector β, an action alternative having the highest selection probability among the action alternatives, as the action alternative to be selected (step S1205).

Thereafter, the action selection learning processing unit 270 causes the clustering unit 278 to extract model parameter vectors β having the highest selection probability for the action alternative selected by the user on the terminal device 300 (step S1206). In other words, the clustering unit 278 extracts model parameter vectors β whose action alternative assigned by the reference model selection assignment unit 277 matches with the action alternative as the selection result received from the terminal device 300.

Subsequently, the action selection learning processing unit 270 causes the reference model storage unit 275 to hold a set of the model parameter vectors β extracted by the clustering unit 278 as a cluster $C_i$ (reference model) (step S1207). The cluster $C_i$ is a subset included in the cluster $C_0$.

Next, the action selection learning processing unit 270 causes the clustering unit 278 to determine whether the cluster $C_i$ extracted in step S1206 matches with the cluster $C_{i-1}$ (step S1208).

When the two clusters match with each other in step S1208, it is indicated that the cluster $C_i$ is similar to the model parameter vector β of the user of the terminal device 300; accordingly, the action selection learning processing unit 270 ends the processing.

When the two clusters do not match with each other in step S1208, the action selection learning processing unit 270 causes the model parameter vector calculation unit 279 to calculate the model parameter vector β of the user based on the cluster $C_i$ (step S1209). Note that the details of the calculation of the model parameter vector β of the user by the model parameter vector calculation unit 279 will be described later.

Subsequently, the action selection learning processing unit 270 causes the validity determination unit 280 to determine whether the model parameter vector β of the user calculated in step S1209 is valid (step S1210).

Specifically, the validity determination unit 280 calculates the selection probability of each action alternative presented on the terminal device 300 using the calculated model parameter vector β of the user, and determines whether the action alternative having the highest selection probability matches with the action alternative as the selection result.

When it is determined by the validity determination unit 280 that the calculated model parameter vector β is not valid (step S1211), that is, when the action alternative having the highest selection probability does not match with the action alternative as the selection result, the action selection learning processing unit 270 ends the processing as it is.

Meanwhile, when it is determined in step S1211 that the calculated model parameter vector β is valid, that is, when the action alternative having the highest selection probability matches with the action alternative as the selection result, the action selection learning processing unit 270 updates the model parameter vector of the user (step S1212), and ends the processing. Specifically, the action selection learning processing unit 270 rewrites the value of each parameter corresponding to the user ID of the terminal device 300 in the user database 210 to the value of each parameter included in the calculated model parameter vector β.

In the following, the processing of the action selection learning processing unit 270 of the present embodiment will be further described with reference to FIGS. 13 to 15.

Note that, in FIGS. 13 to 15, description will be given assuming that parameters included in the model parameter vector β are two of $β_1$ and $β_2$, for convenience of explanation.

Figure 13:
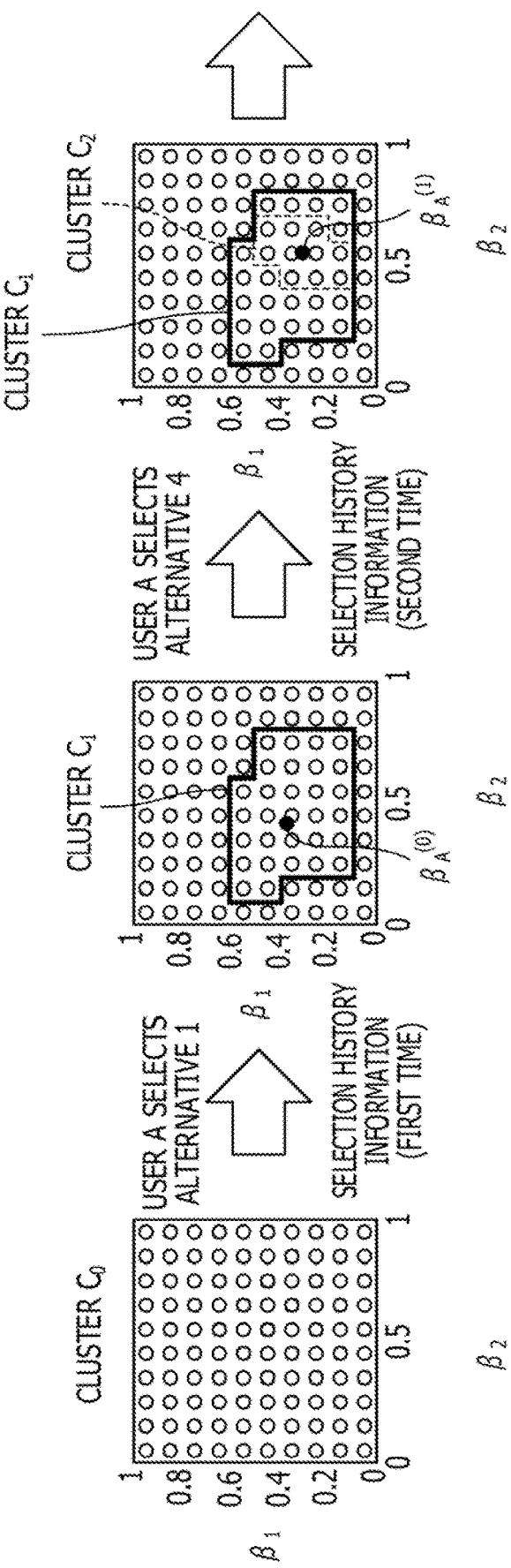
FIG. 13 is a first diagram to describe processing of the action selection learning processing unit of the first embodiment.

FIG. 13 is a first diagram to describe processing of the action selection learning processing unit of the first embodiment. FIG. 14 is a second diagram to describe processing of the action selection learning processing unit of the first embodiment. The example in FIG. 13 illustrates a case where the action selection learning processing unit 270 receives the action alternative as the selection result from the terminal device 300 for the first time, and a case where the action selection learning processing unit 270 receives the selection result from the terminal device 300 for the second time. The example in FIG. 14 illustrates a case where the update of the model parameter vector of the user is no longer necessary, as a result of the action selection learning processing unit 270 receiving the third selection result.

When the action selection learning processing unit 270 receives the selection result from the terminal device 300 for the first time, the action selection learning processing unit 270 generates the cluster $C_0$ as a reference model. Then, the action selection learning processing unit 270 supplies first selection history information to the cluster $C_0$.

Here, description will be given assuming that the user A of the terminal device 300 selects alternative 1 from among the presented action alternatives.

In this case, in regard to respective model parameter vectors β included in the cluster $C_0$, the action selection learning processing unit 270 extracts a set of model parameter vectors β having the highest selection probability for alternative 1, as the cluster $C_1$. In the example in FIG. 13, a cluster $C_1$ including a model parameter vector $β_A^{(0)}$ of the user A stored in the user database 210 is generated. The generated cluster $C_1$ is stored by the reference model storage unit 275.

In addition, at this time, since the cluster $C_0$ does not match with the cluster $C_1$, the action selection learning processing unit 270 causes the model parameter vector calculation unit 279 to update the model parameter vector $β_A^{(0)}$ to a model parameter vector $β_A^{(1)}$ calculated based on the cluster $C_1$.

Here, the calculation of the model parameter vector β of the user A by the model parameter vector calculation unit 279 of the present embodiment will be described.

The model parameter vector calculation unit 279 of the present embodiment calculates the model parameter vector β of the user A by following expression (4). The model parameter vector β of the user A calculated here has a value obtained by weighting the average of all parameters of the model parameter vectors β included in the cluster $C_1$ based on the selection probability.

[Expression 4]

$$(\widetilde{β_{1,A}}, \widetilde{β_{2,A}}) = \left(\sum_i ω_i β_{1,i}, \sum_i ω_i β_{2,i}\right) \quad i \in C \qquad \text{Expression (4)}$$

$$\text{where } ω_i = \frac{p_i}{\sum_j p_j}$$

$p_i$: Selection Probability of Reference Model i

Note that, in expression (4), the parameters included in the model parameter vector β of the user A are $β_{1,A}$, $β_{2,A}$. In addition, in expression (4), C denotes a cluster.

Furthermore, in expression (4), pi indicates the value of the highest selection probability among the selection probabilities of the action alternative same as the action alternative of the user, which are calculated based on the i-th model parameter vectors β included in the reference model or the extraction reference model.

Next, the action selection learning processing unit 270 receives, from the terminal device 300, alternative 4 out of the presented action alternatives, as a selection result.

In this case, the action selection learning processing unit 270 supplies second selection history information including alternative 4, which is a selection result, and the presented action alternatives to the cluster $C_1$.

Then, in regard to respective model parameter vectors β included in the cluster $C_1$, the action selection learning processing unit 270 extracts a set of model parameter vectors β having the highest selection probability for alternative 4, as the cluster $C_2$. In the example in FIG. 13, a cluster $C_2$ Including the model parameter vector $\beta_A^{(1)}$ of the user A is generated. The generated cluster $C_2$ is stored by the reference model storage unit 275.

In addition, at this time, since the cluster $C_1$ does not match with the cluster $C_2$, the action selection learning processing unit 270 causes the model parameter vector calculation unit 279 to update the model parameter vector $\beta_A^{(1)}$ to a model parameter vector $\beta_A^{(2)}$ calculated based on the cluster $C_2$.

Figure 14:
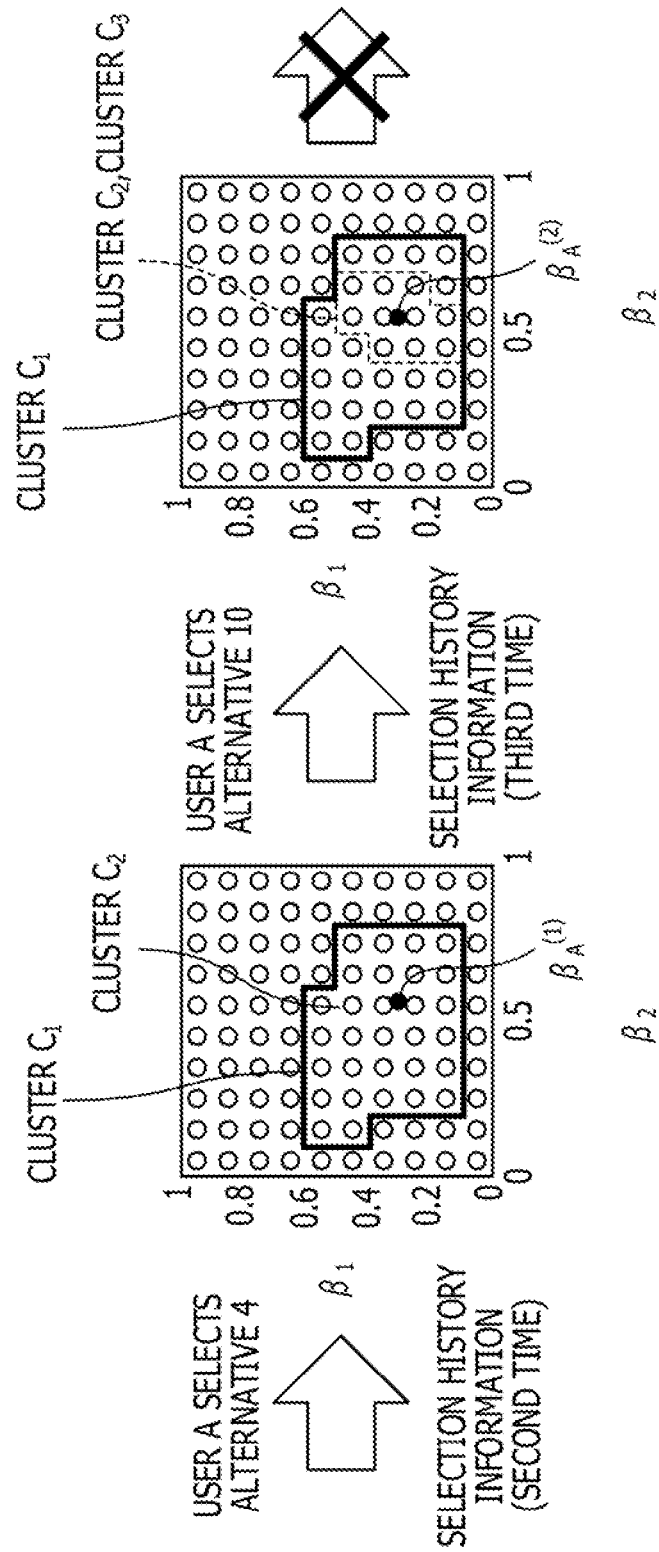
FIG. 14 is a second diagram to describe processing of the action selection learning processing unit of the first embodiment.

Next, FIG. 14 is referred to.

The action selection learning processing unit 270 receives, from the terminal device 300, alternative 10 out of the presented action alternatives at the third presentation of action alternatives, as a selection result.

In this case, the action selection learning processing unit 270 supplies third selection history information including alternative 10, which is a selection result, and the presented action alternatives to the cluster $C_2$.

Then, in regard to respective model parameter vectors β included in the cluster $C_2$, the action selection learning processing unit 270 extracts a set of model parameter vectors β having the highest selection probability for alternative 10, as the cluster $C_3$. In the example in FIG. 14, a cluster $C_3$ including the model parameter vector $\beta_A^{(2)}$ of the user A is generated. The generated cluster $C_3$ is stored by the reference model storage unit 275.

Here, in the example in FIG. 14, the cluster $C_2$ matches with the cluster $C_3$. Accordingly, the action selection learning processing unit 270 does not update the model parameter vector $\beta_A^{(2)}$, and stores the value of each parameter included in this model parameter vector $\beta_A^{(2)}$ in the user database 210.

Figure 15:
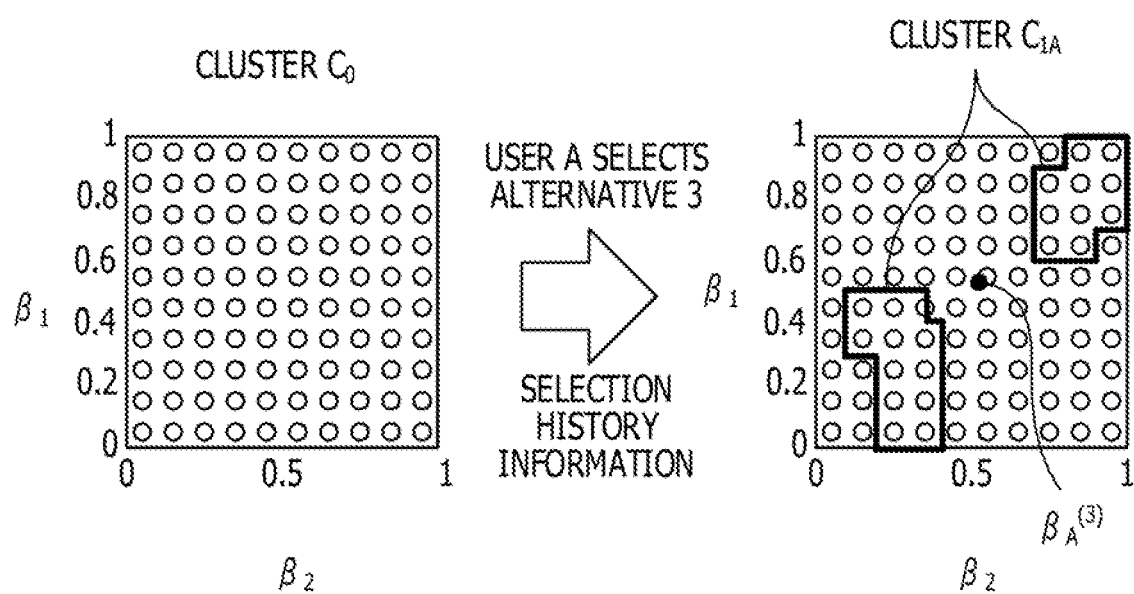
FIG. 15 is a third diagram to describe processing of the action selection learning processing unit of the first embodiment.

FIG. 15 is a third diagram to describe processing of the action selection learning processing unit of the first embodiment. FIG. 15 illustrates a case where it is determined that the model parameter vector $\beta_A$ of the user A calculated by the model parameter vector calculation unit 279 is not valid, in the determination by the validity determination unit 280.

In FIG. 15, when the selection result is received from the terminal device 300 for the first time, the cluster $C_0$ is generated as a reference model. Then, the action selection learning processing unit 270 supplies first selection history information to the cluster $C_0$. The selection result included in the supplied selection history information is alternative 3.

In this case, in regard to respective model parameter vectors β included in the cluster $C_0$, the action selection learning processing unit 270 extracts model parameter vectors β having the highest selection probability for alternative 3, as a cluster $C_{1A}$. In addition, the action selection learning processing unit 270 calculates a model parameter vector $\beta_A^{(3)}$ of the user A using the cluster $C_{1A}$.

At this time, in the present embodiment, among the action alternatives included in the selection history information supplied to the cluster $C_0$, an alternative having the highest selection probability is worked out based on the model parameter vector $\beta_A^{(3)}$, and it is determined whether the worked-out alternative matches with the selection result of the user A. In the case of FIG. 15, since the two alternatives do not match with each other, the action selection learning processing unit 270 ends the processing without updating the user database 210 with the model parameter vector $\beta_A^{(3)}$.

In the present embodiment, as described above, a model parameter vector indicating a factor that influences the satisfaction level of the user obtained by selecting an action, and the influence level of the factor is generated for each user of the terminal device 300 based on the action alternative selection history of the user. Then, in the present embodiment, action alternatives are generated and presented to the user based on the model parameter vector for each user. Therefore, according to the present embodiment, alternatives of actions easily acceptable by the user can be presented by a simple procedure.

Note that the alternative generation unit 272 of the present embodiment generates possible action alternatives from the transportation service operation database 240, the event database 250, the shop database 260, and the like when accepting a presentation request for an action alternative from the terminal device 300. Then, the alternative generation unit 272 calculates the selection probability of the generated action alternative based on the model parameter vector β of the user, and may select action alternatives to be presented to the user in descending order of the selection probability to transmit the selected action alternatives to the terminal device 300.

In the present embodiment, since the model parameter vector β referred to at this time is for each individual user, action alternatives easily acceptable by the user can be presented, and the possibility of changing the action of the individual user can be raised.

Figure 16:
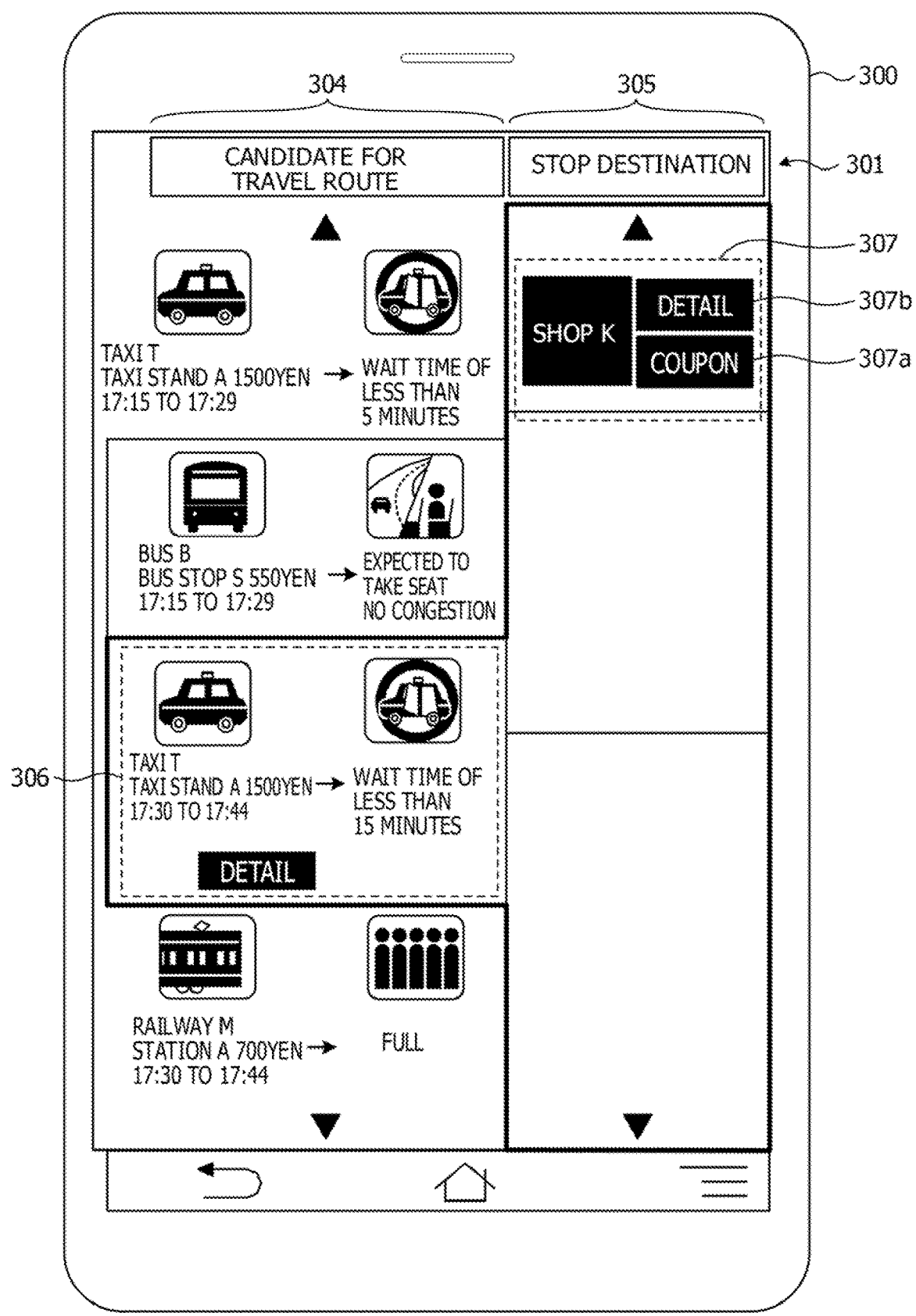
FIG. 16 is a diagram illustrating an example of a screen on which action alternatives are displayed on the terminal device of the first embodiment.

Next, an example in which action alternatives are displayed on the terminal device 300 will be described with reference to FIG. 16. FIG. 16 is a diagram illustrating an example of a screen on which action alternatives are displayed on the terminal device of the first embodiment.

A screen 301 illustrated in FIG. 16 has display fields 304 and 305, and displays combinations of traveling means and shops for each time zone as action alternatives.

On the screen 301, a combination of a traveling means n and a time zone l is displayed in the display field 304 as an action alternative. In addition, on the screen 301, information on a shop associated with the combination of the traveling means n and the time zone l is displayed in the display field 305 as an action alternative.

The example in FIG. 16 illustrates a case where the user has selected a combination of "traveling from taxi stand A by taxi T from 17:30 to 17:44" in the display field 304. In this case, the display field 305 displays shop information 307 on a shop associated with the selected combination.

The shop information 307 may include, for example, a uniform resource locator (URL) of a screen on which a coupon is displayed, when the coupon presence or absence of the associated shop is "present" in the shop database 260. In addition, the URL of the home page of the associated shop may be displayed in the shop information 307.

In the example in FIG. 16, a coupon may be displayed on the screen 301 when a coupon button 307a is operated in the shop information 307. In addition, in the example in FIG. 16, the home page of a shop K may be displayed on the screen 301 when a detail button 307b is operated in the shop information 307.

Note that, in the example in FIG. 16, information indicating the congestion status of the traveling means is displayed, but information indicating the congestion status of the shop is not displayed; however, the display of the congestion status is not limited to this example. For example, when the stop destination is a facility with a limited number of seats, such as a movie theater or restaurant, information indicating the congestion status according to the congestion level of each facility stored in the shop database 260 may be displayed.

Second Embodiment

In the following, a second embodiment will be described with reference to the drawings. The second embodiment differs from the first embodiment in the clustering method in an action selection learning processing unit 270. Therefore, in a description of the second embodiment below, only differences from the first embodiment will be described, and those having functional configurations similar to those in the first embodiment will be denoted by reference signs similar to reference signs used in the description of the first embodiment, and a description thereof will be omitted.

In the present embodiment, in a series of selections of action alternatives by the user, a model parameter vector $\beta$ having a certain percentage or more at which the alternative having the highest selection probability matches with the alternative selected by the user is regarded as a model parameter vector that indicates an action similar to the user.

Figure 17:
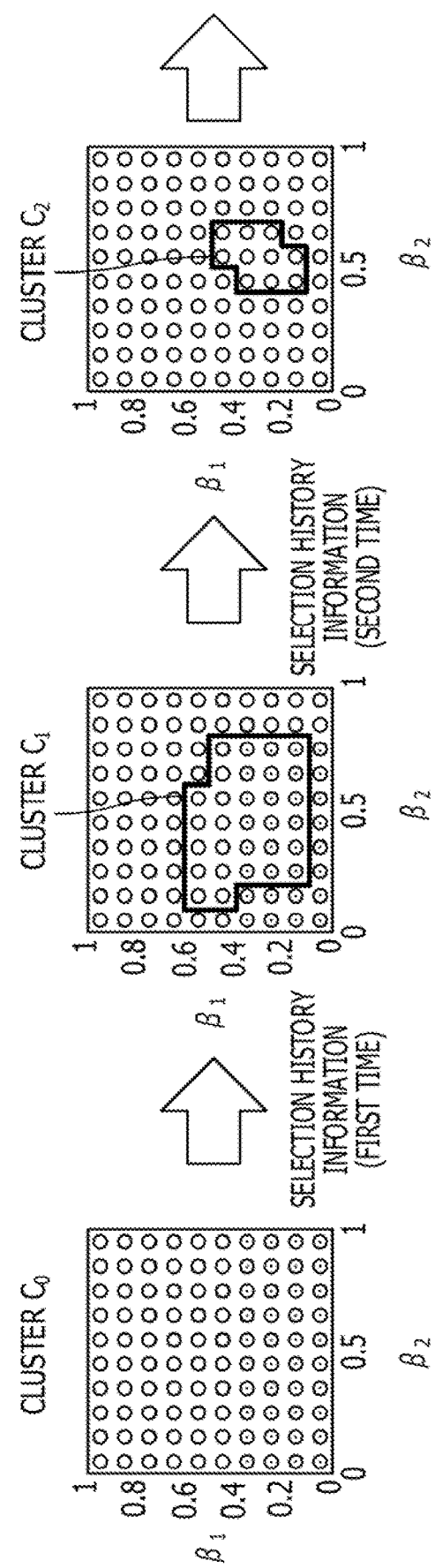
FIG. 17 is a diagram to describe clustering of a second embodiment.

The clustering by a clustering unit 278 of the present embodiment will be described below with reference to FIG. 17. FIG. 17 is a diagram to describe clustering of the second embodiment.

Note that FIG. 17 illustrates an example in which a series of selections of action alternatives by the user is assumed as three times, and a cluster is generated from a model parameter vector $\beta$ having a percentage of 60% or more at which the alternative having the highest selection probability matches with the alternative selected by the user.

In FIG. 17, it is assumed that the user selects alternative 1 from among action alternatives at the first presentation of action alternatives, the user selects alternative 2 from among action alternatives at the second presentation of action alternatives, and, the user selects alternative 3 from among action alternatives at the third presentation of action alternatives.

In this case, the action selection learning processing unit 270 extracts a set of model parameter vectors $\beta$ in which the alternative having the highest selection probability matches with the alternative selected by the user twice or more, to generate a cluster.

For example, the action selection learning processing unit 270 generates a reference model (cluster $C_0$). Then, a set of model parameter vectors $\beta$ having the highest selection probability for alternative 1 in the first selection is extracted as a cluster $C_1$ from the model parameter vectors $\beta$ included in the cluster $C_0$.

Next, the action selection learning processing unit 270 extracts a set of model parameter vectors $\beta$ having the highest selection probability for alternative 2 out of action alternatives for the second selection, as a cluster $C_2$ from the model parameter vectors $\beta$ included in the cluster $C_0$.

Similarly, the action selection learning processing unit 270 extracts a set of model parameter vectors $\beta$ having the highest selection probability for alternative 3 out of action alternatives for the third selection, as a cluster $C_3$ from the model parameter vectors $\beta$ included in the cluster $C_0$.

Then, the action selection learning processing unit 270 extracts a set of model parameter vectors $\beta$ in which the alternative having the highest selection probability matches with the alternative selected by the user twice or more, as an extraction reference model (cluster) from the extracted clusters $C_1$, $C_2$, and $C_3$, and calculates a model parameter vector $\beta$ based on the extraction reference model.

In the present embodiment, in this manner, by generating a cluster as a basis of the calculation of the model parameter vector $\beta$ of the user, the model parameter vector $\beta$ of the user can be updated by including a model parameter vector similar to the model parameter vector $\beta$ of the user.

Note that, when a model parameter vector similar to the model parameter vector $\beta$ of the user is extracted by the above-described method, for example, the number of times of selection involved retrospectively to the past is assumed to be designated in advance. For example, when the past ten times of selection is retrospectively involved, it is only required to extract a model parameter vector of which the number of times the selection result of the user matches with the alternative having the highest selection probability among action alternatives for each selection is six times or more out of the past ten times of selection, to generate a cluster.

Figure 18:
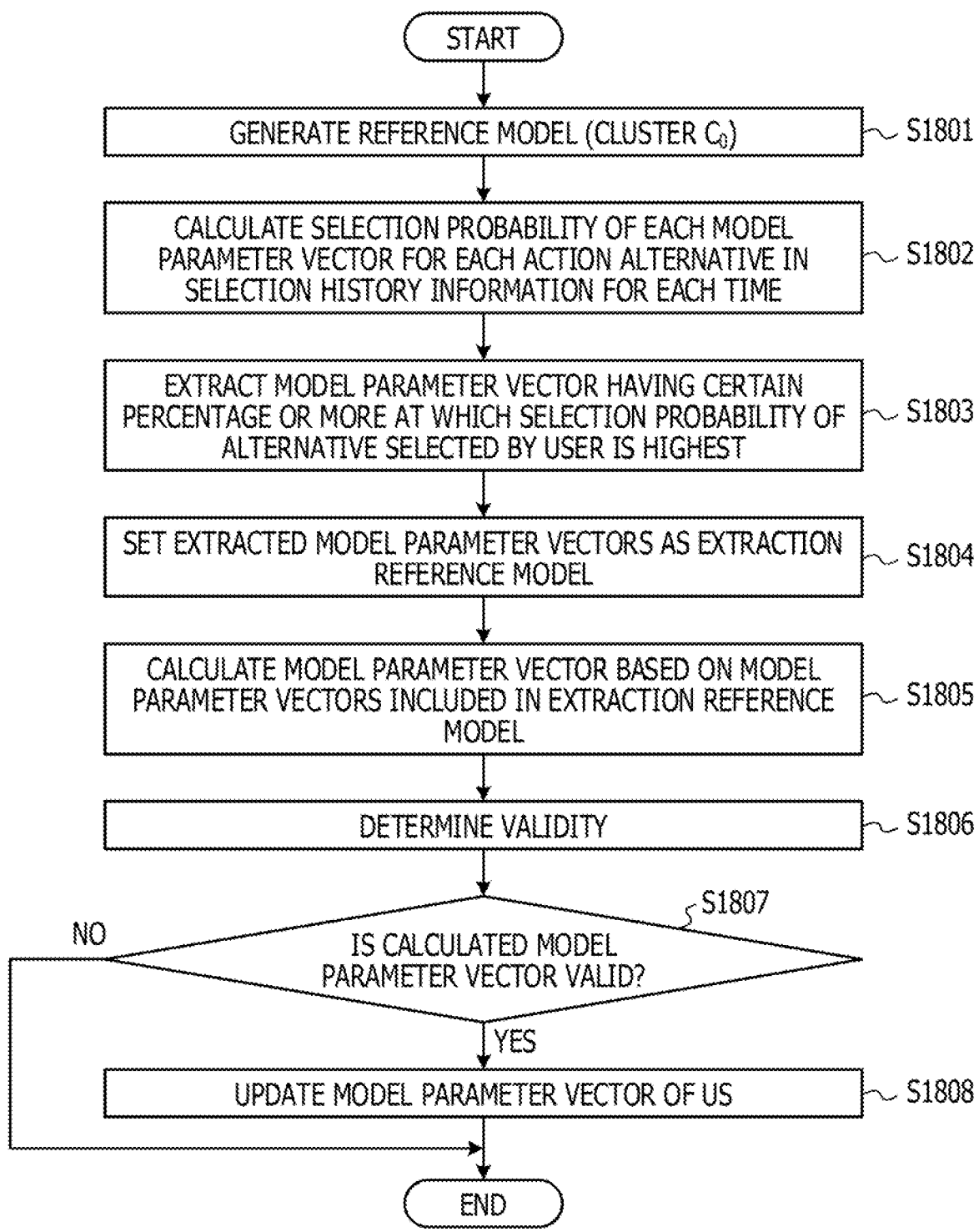
FIG. 18 is a flowchart to describe processing of an action selection learning device of the second embodiment.

In the following, the processing of the action selection learning processing unit 270 in the present embodiment will be described with reference to FIG. 18. FIG. 18 is a flowchart to describe processing of an action selection learning device of the second embodiment. FIG. 18 illustrates the details of the update processing for the model parameter vector of the user in the present embodiment.

The action selection learning processing unit 270 of the present embodiment causes a reference model generation unit 274 to generate a reference model and store the reference model in a reference model storage unit 275 (step S1801).

Subsequently, the action selection learning processing unit 270 calculates the selection probability of each action alternative for each model parameter vector $\beta$ included in the reference model in the selection history information for a predetermined number of times (step S1802).

Thereafter, the action selection learning processing unit 270 causes a clustering unit 278 to extract model parameter vectors $\beta$ having a percentage of a predetermined value or more at which the alternative having the highest selection probability matches with the selection result in the selection history information for the predetermined number of times (step S1803). The predetermined value at this time may be, for example, about 90%, or may be set in advance.

Subsequently, the action selection learning processing unit 270 stores a set of model parameter vectors $\beta$ extracted by the clustering unit 278 as an extraction reference model (cluster) in the reference model storage unit 275 (step S1804).

Next, the action selection learning processing unit 270 calculates the model parameter vector $\beta$ of the user based on the model parameter vectors $\beta$ included in the extraction reference model (step S1805), and proceeds to step S1806.

Figure 12:
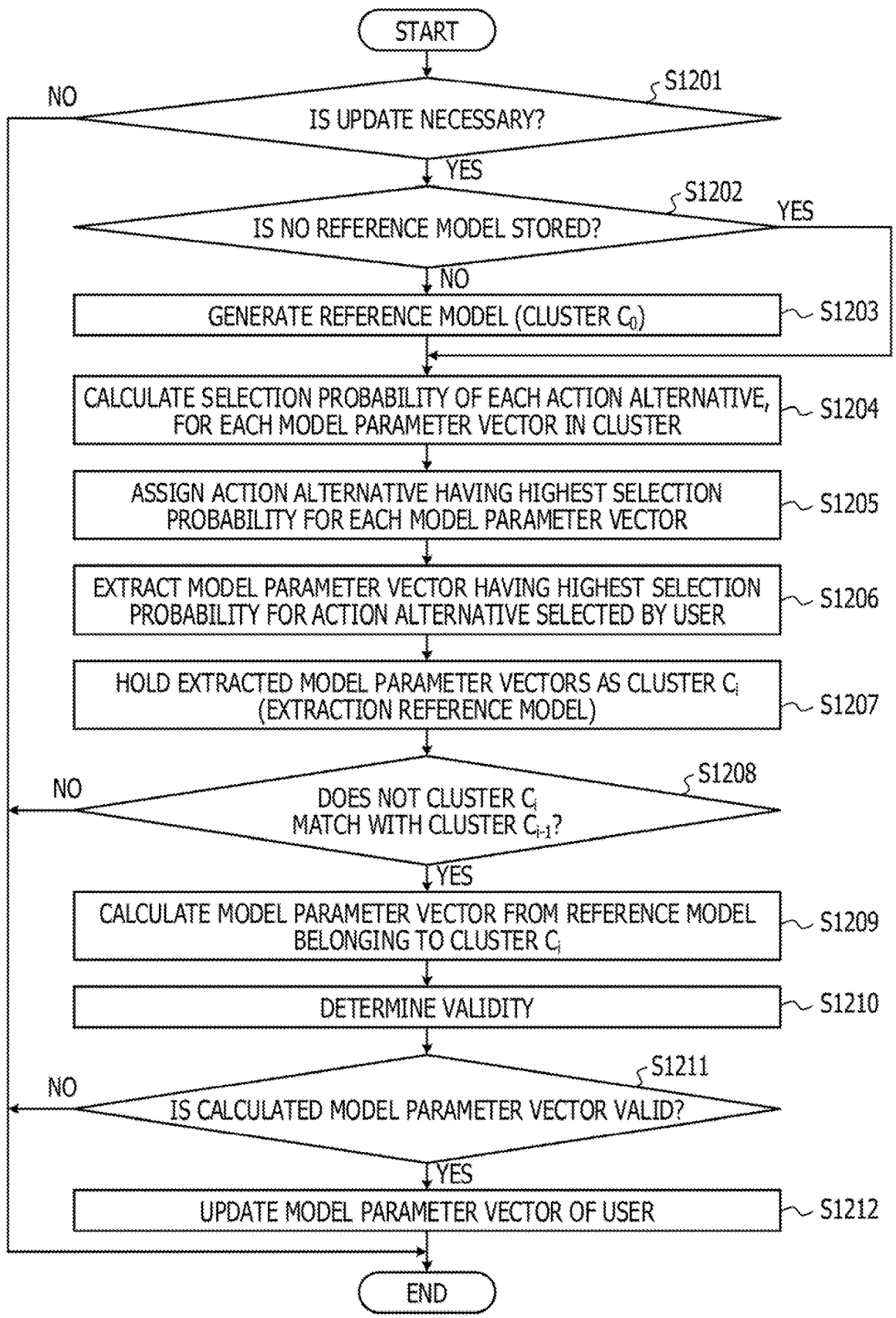
FIG. 12 is a second flowchart to describe processing of the action selection learning device of the first embodiment.

Since processing from step S1806 to step S1808 is similar to processing from step S1210 to step S1212 in FIG. 12, a description thereof will be omitted.

Note that, in the present embodiment, a set of model parameter vectors $\beta$ having a certain percentage or more at which the selection result for action alternatives matches with the alternative having the highest selection probability is assumed as the extraction reference model; however, the extraction reference model is not limited to this case.

In the present embodiment, for example, a set of model parameter vectors β having a probability equal to or greater than a threshold at which the selection result for action alternatives by the user in the past N times matches with the alternative having the highest selection probability may be assumed as the extraction reference model.

Here, for example, when an alternative selected by the user in the past k-th selection is assumed as $i_k$, the selection probability of the alternative $i_k$ is assumed as $Prob_{i_k}$. In this case, the extraction reference model can be generated from a model parameter vectors β in which the probability of selecting the same alternative as the user for the past N consecutive times satisfies conditions illustrated in following expression (5), to update the model parameter vector of the user. Note that P denotes the threshold.

[Expression 5]

$$\prod_{k=1}^{N} Prob_{i_k} > P \qquad \text{Expression (5)}$$

Third Embodiment

In the following, a third embodiment will be described with reference to the drawings. The third embodiment differs from the first embodiment in considering a case where the user only browses the presented action alternatives when the action alternatives are presented, and does not perform any operation to select. Therefore, in a description of the third embodiment below, only differences from the first embodiment will be described, and those having functional configurations similar to those in the first embodiment will be denoted by reference signs similar to reference signs used in the description of the first embodiment, and a description thereof will be omitted.

Figure 19:
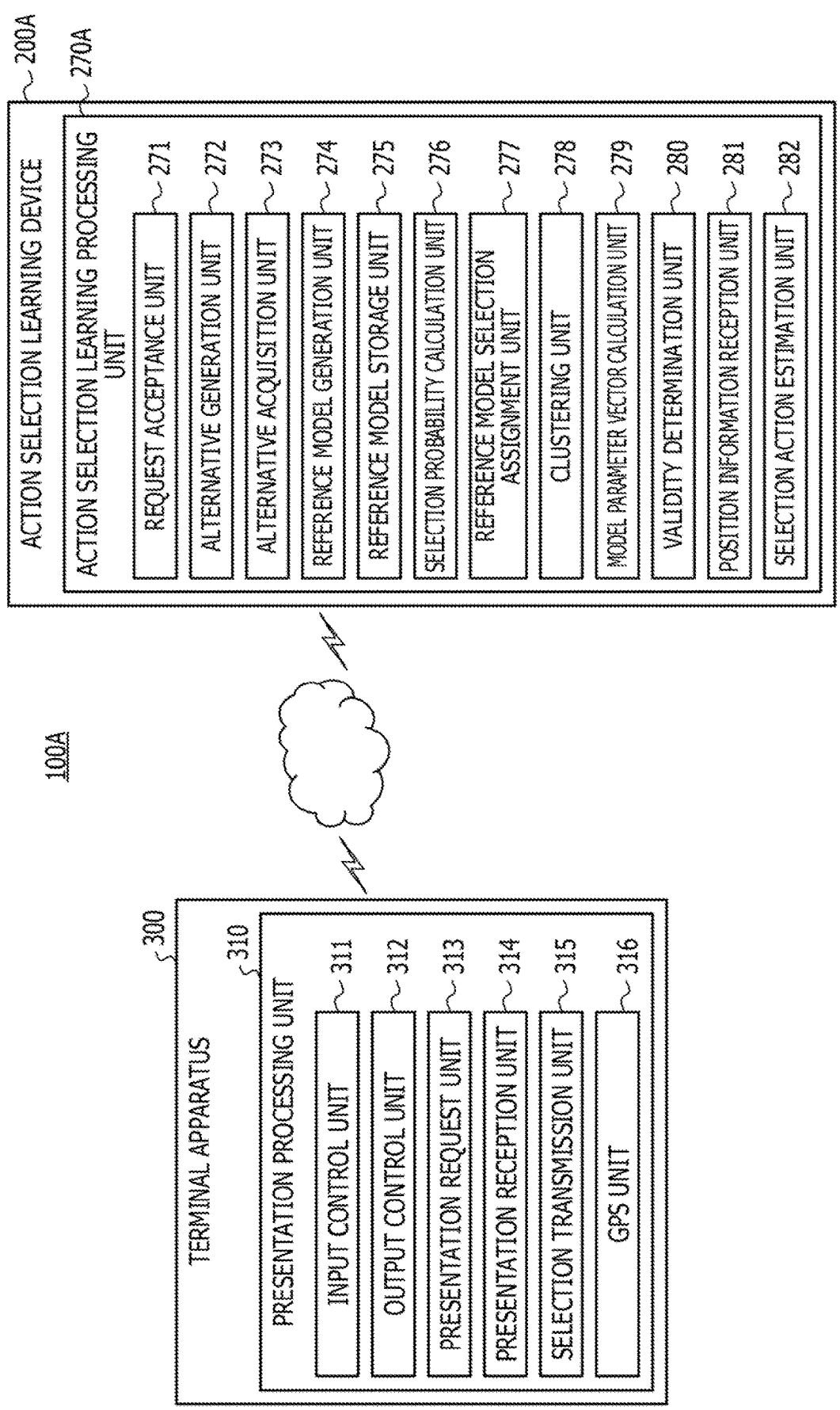
FIG. 19 is a diagram to describe functions of respective devices included in an action selection learning system of a third embodiment.

FIG. 19 is a diagram to describe functions of respective devices included in an action selection learning system of the third embodiment.

The action selection learning system 100A of the present embodiment includes an action selection learning device 200A and a terminal device 300. The action selection learning device 200A of the present embodiment includes an action selection learning processing unit 270A.

The action selection learning processing unit 270A of the present embodiment includes a selection action estimation unit 282 in addition to all the units included in the action selection learning processing unit 270 of the first embodiment.

The selection action estimation unit 282 of the present embodiment estimates an action alternative selected by the user of the terminal device 300 based on the position information received by a position information reception unit 281 from the terminal device 300. For example, the action selection learning processing unit 270A examines a case where the terminal device 300 is presented with three action alternatives, namely, an action alternative for using a bus, an action alternative for using a railway, and an action alternative for using a taxi. In this case, even if the action selection learning processing unit 270 does not receive the selection result, the action selection learning processing unit 270 can estimate that the action alternative has been selected, when a place indicated by the position information on the terminal device 300 is in the vicinity of a bus stop.

Figure 20:
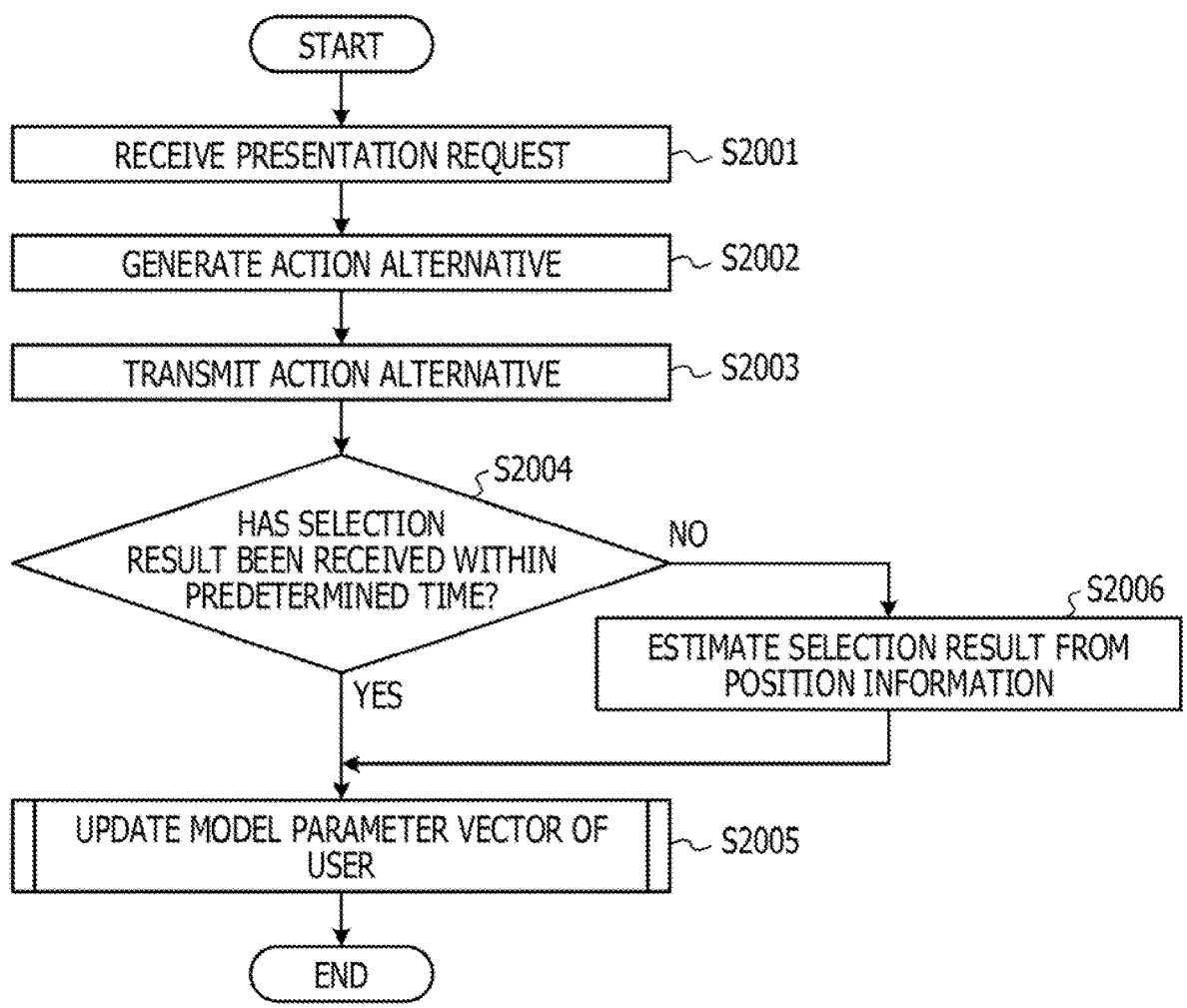
FIG. 20 is a flowchart to describe processing of an action selection learning device of the third embodiment.

In the following, the processing of the action selection learning device 200A of the present embodiment will be described with reference to FIG. 20. FIG. 20 is a flowchart to describe processing of the action selection learning device of the third embodiment.

Figure 11:
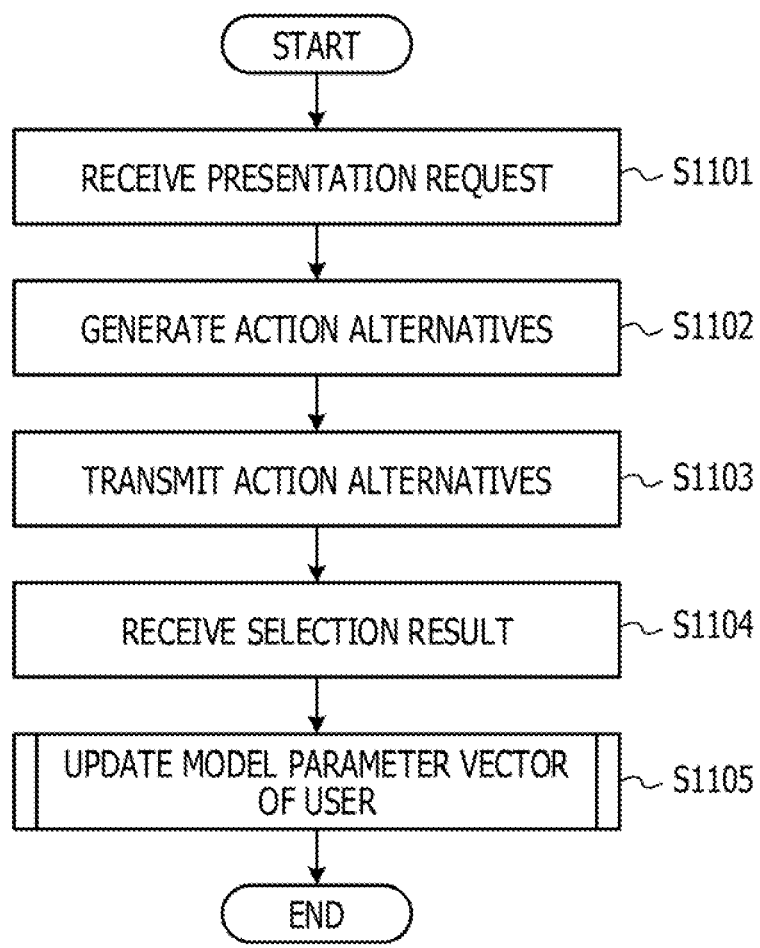
FIG. 11 is a first flowchart to describe processing of the action selection learning device of the first embodiment.

Since processing from step S2001 to step S2003 in FIG. 20 is similar to processing from step S1101 to step S1103 in FIG. 11, a description thereof will be omitted.

An alternative acquisition unit 273 of the action selection learning processing unit 270A determines whether the selection result has been received within a predetermined time after transmitting the action alternatives (step S2004).

When the selection result has not been received within the predetermined time in step S2004, the action selection learning processing unit 270 causes the selection action estimation unit 282 to estimate the action selected on the terminal device 300, based on the position information received by the position information reception unit 281 (step S2005). At this time, the selection action estimation unit 282 of the present embodiment may store the action alternative as the result of estimation in the selection result of the selection history database 220.

When the selection result has been received within the predetermined time in step S2004, the action selection learning processing unit 270A proceeds to step S2006. Since processing in step S2006 is similar to processing in step S1105 in FIG. 11, a description thereof will be omitted.

As described above, according to the present embodiment, the action selected by the user of the terminal device 300 can be estimated, even if the user does not perform any operation to select the action alternative on the terminal device 300. Therefore, according to the present embodiment, even when the user of the terminal device 300 selects an action with reference to the presented action alternatives, the selected action can be reflected in the model parameter vector β for each user.

The present invention is not limited to the embodiments specifically disclosed above, and various modifications and changes can be made without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An action selection learning device comprising:
a memory; and
a processor coupled to the memory and configured to:
generate a reference model that is a set of model parameter vectors that indicate an influence level of each factor that influences selection of an action alternative;
calculate a selection probability for each action alternative, for each of the model parameter vectors,
calculate a model parameter vector for each user using a subset of model parameter vectors extracted from the reference model, based on the selection probability for each action alternative and a selection history of the action alternative by each user,
generate action alternatives based on the model parameter vector for each user, and
transmit the generated action alternatives to a terminal device.

2. The action selection learning device according to claim 1, wherein the processor is configured to
assign an action alternative with a highest value of the selection probability for each action alternative, as an action alternative to be selected for the model parameter vector.

3. The action selection learning device according to claim 2, wherein the processor is configured to:
extract the subset from the reference model, and
extract the model parameter vectors in which the action alternative with the highest value of the selection probability for each action alternative matches with an action alternative selected by the user.

4. The action selection learning device according to claim 3, wherein the processor is configured to
extract the model parameter vectors with a percentage equal to or more than a predetermined percentage at which an action alternative with a highest value of the selection probability for each action alternative matches with an action alternative selected by the user.

5. The action selection learning device according to claim 3, wherein the processor is configured to
extract the model parameter vectors with a probability equal to or more than a predetermined probability at which an action alternative with a highest value of the selection probability for each action alternative matches with an action alternative selected by the user.

6. The action selection learning device according to claim 1, wherein the processor is configured to
calculate the model parameter vector for each user based on the selection probability for each action alternative calculated for each of the model parameter vectors included in the subset.

7. The action selection learning device according to claim 1, wherein the processor is configured to:
acquire an action alternative selected on the terminal device; and
store selection history information in which the generated action alternative is associated with the acquired action alternative.

8. The action selection learning device according to claim 7, wherein the processor is configured to:
receive position information on the terminal device; and
estimate an action alternative selected by a user of the terminal device based on the position information; and
store the estimated action alternative in the memory in association with an action alternative generated by the alternative generation unit.

9. The action selection learning device according to claim 1, wherein the processor is configured to:
store the model parameter vector for each user;
determine whether the model parameter vector for each user stored in the memory is to be updated to the calculated model parameter vector for each user; and
determine that the model parameter vector for each user stored in the memory is to be updated, when an action alternative with a highest value of the selection probability for each action alternative calculated for the model parameter vector for each user, among a plurality of values of the selection probability, matches with an action alternative indicated by the selection history.

10. The action selection learning device according to claim 1,
wherein the factor that influences selection of the action alternative is a factor that influences a satisfaction level obtained by the user owing to selecting an action alternative.

11. A non-transitory computer-readable storage medium storing a program that causes a computer to execute a process, the process comprising:
generating a reference model that is a set of model parameter vectors that indicate an influence level of each factor that influences selection of an action alternative;
calculating a selection probability for each action alternative, for each of the model parameter vectors;
calculating a model parameter vector for each user using a subset of model parameter vectors extracted from the reference model, based on the selection probability for each action alternative and a selection history of the action alternative by each user; and
generating the action alternatives based on the model parameter vector for each user and transmitting the generated action alternatives to a terminal device.

12. An action selection learning method executed by a computer, the method comprising:
generating a reference model that is a set of model parameter vectors that indicate an influence level of each factor that influences selection of an action alternative;
calculating a selection probability for each action alternative, for each of the model parameter vectors;
calculating a model parameter vector for each user using a subset of model parameter vectors extracted from the reference model, based on the selection probability for each action alternatives and a selection history of the action alternative by each user; and
generating the action alternative based on the model parameter vector for each user and transmitting the generated action alternatives to a terminal device.

13. The action selection learning method according to claim 12, wherein the generating the action alternative includes
assigning an action alternative with a highest value of the selection probability for each action alternative, as an action alternative to be selected for the model parameter vector.

14. The action selection learning method according to claim 13, wherein the calculating the model parameter vector includes
extracting the model parameter vectors in which the action alternative with the highest value of the selection probability for each action alternative matches with an action alternative selected by the user.

* * * * *